US 10,774,255 B2

(12) United States Patent
Boul

(10) Patent No.: US 10,774,255 B2
(45) Date of Patent: Sep. 15, 2020

(54) HIGH PERFORMANCE BRINE VISCOSIFIER

(71) Applicant: Saudi Arabian Oil Company, Dhahran (SA)

(72) Inventor: Peter Boul, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 23 days.

(21) Appl. No.: 15/868,525

(22) Filed: Jan. 11, 2018

(65) Prior Publication Data

US 2018/0194985 A1      Jul. 12, 2018

Related U.S. Application Data

(60) Provisional application No. 62/444,894, filed on Jan. 11, 2017.

(51) Int. Cl.
*C09K 8/12*      (2006.01)
*C09K 8/035*     (2006.01)

(52) U.S. Cl.
CPC ................ *C09K 8/12* (2013.01); *C09K 8/035* (2013.01)

(58) Field of Classification Search
CPC .................................. C09K 8/035; C09K 8/12
See application file for complete search history.

(56) References Cited

U.S. PATENT DOCUMENTS

| | | | |
|---|---|---|---|
| 4,554,081 A | 11/1985 | Borchardt et al. | |
| 4,619,773 A | 10/1986 | Heilweil et al. | |
| 5,988,279 A | 11/1999 | Udarbe et al. | |
| 6,107,256 A * | 8/2000 | Udarbe | C09K 8/24 166/295 |
| 7,183,239 B2 | 2/2007 | Smith et al. | |
| 7,576,038 B2 | 8/2009 | Smith | |
| 9,102,865 B2 | 8/2015 | Fox | |
| 2006/0185842 A1* | 8/2006 | Chen | C09K 8/68 166/170 |
| 2008/0202749 A1* | 8/2008 | Schwartz | B08B 9/0555 166/280.2 |
| 2009/0062158 A1 | 3/2009 | Losasso et al. | |
| 2010/0062953 A1 | 3/2010 | Losasso et al. | |

(Continued)

FOREIGN PATENT DOCUMENTS

WO    WO0071635 A1    11/2000
WO    WO2004094781 A1    11/2004
(Continued)

OTHER PUBLICATIONS

International Search Report and Written Opinion for related PCT application PCT/US2018/013339 dated Mar. 9, 2018.
(Continued)

*Primary Examiner* — Alicia Bland
(74) *Attorney, Agent, or Firm* — Bracewell LLP; Constance G. Rhebergen; Kevin R. Tamm

(57) ABSTRACT

A viscosity-retaining formulation for use in high-temperature hydrocarbon-bearing reservoir applications. The formulation includes a brine composition and a viscosity enhancing composition, the viscosity enhancing composition operable to enhance viscosity retention of the viscosity-retaining formulation at least, in part, through micellization, the viscosity enhancing composition including a polycation composition and an anionic surfactant composition.

19 Claims, 15 Drawing Sheets

(56) References Cited

U.S. PATENT DOCUMENTS

| | | |
|---|---|---|
| 2010/0210482 A1 | 8/2010 | Fox |
| 2010/0256298 A1 | 10/2010 | Wu et al. |
| 2010/0324166 A1 | 12/2010 | Wu |
| 2012/0186877 A1 | 7/2012 | Ezell |
| 2014/0034143 A1* | 2/2014 | Smith ............ C09K 8/04 137/14 |
| 2014/0128295 A1* | 5/2014 | Wagles ............ C09K 8/08 507/111 |
| 2014/0326457 A1 | 11/2014 | Favero |
| 2014/0342951 A1* | 11/2014 | Augsburger ............ C09K 8/52 507/202 |
| 2015/0000985 A1 | 1/2015 | Zhou et al. |
| 2015/0027702 A1 | 1/2015 | Godoy-Vargas et al. |

FOREIGN PATENT DOCUMENTS

| | | |
|---|---|---|
| WO | WO2008068467 A1 | 6/2008 |
| WO | WO2011023967 A1 | 3/2011 |

OTHER PUBLICATIONS

R. Horton, A New Biiopolymer-Free, Low Solids, High Density Reservoir Drilling Fluid, SPE68965, May 21, 2001.

S. Chatterjee, Microscopic Evidence of "Necklace and Bead"—Like Morphology of Polymer-Surfactant Complexes: A Comparative Study on Poly(vinylpyrrolidone)—Sodium Dodecyl Sulfate, ACS Publications, Langmuir 2014, 30, 9859-9865.

S. Mukherjee, Physiochemistry of Interaction Between The Cationic Polymer Poly(diallyldimethylammonium chloride) and the Anionic Surfactants Sodium Dodecyl Sulfate, Sodium Dodecylbenzenesulfonate, ACS Publications, Langmuir 2011, 27, 5222-5223.

\* cited by examiner

HIGH PERFORMANCE BRINE VISCOSIFIER

PRIORITY

This non-provisional patent application claims priority to and the benefit of U.S. Prov. App. Ser. No. 62/444,895, filed Jan. 11, 2017, the entire disclosure of which is incorporated here by reference.

BACKGROUND

Field

Embodiments of the disclosure relate to fluids for use in processes to produce hydrocarbons from hydrocarbon-bearing reservoirs. In particular, embodiments of the disclosure relate to compositions and methods for viscosifying fluids for use in processes to produce hydrocarbons from hydrocarbon-bearing reservoirs, such as, for example, drilling fluids.

Description of the Related Art

The construction of oil and gas reservoirs at increasing depths and the development of horizontal and slim-hole drilling have increased the demand for high density, solids-free reservoir drilling fluids (RDFs), completion fluids (CFs), and workover fluids (WFs). Viscosifiers currently used in RDFs, CFs, and WFs are either incompatible with high density brines or require the use of prohibitively expensive brines, such as cesium formate, to achieve target densities. The use of brine-based drilling fluids used in reservoir sections with temperatures exceeding 260° F. is limited due to degradation of the polymers used to viscosify the fluids and suspend drilling cuttings. In addition, the use of divalent brine-based drilling fluids in reservoir sections with temperatures exceeding 260° F. (127° C.) is limited due to degradation of the polymers used to viscosify the fluid and suspend drilling cuttings.

Effective drilling fluids have numerous functions in well construction. They must have the physical properties required to carry cuttings from beneath the drill bit up the annulus of the well for separation at the surface. They must also provide cooling for the drill bit and be able to reduce friction between the drill string and the formation being drilled. This must be accomplished without damaging the formation. The inflow of fluids or solids from the drilling mud can cause formation damage, which can reduce the rate of penetration (ROP) during drilling and can also decrease the rate of hydrocarbon production from a producing well.

RDFs, CFs, and WFs must be density adjusted to provide the hydrostatic head to preserve the integrity of the wellbore walls and to prevent blowouts. Although drilling through much of the well can be done with oil or water-based fluids weighted by solid particles of such minerals as, for example, barite, the reservoir sections are often different in this regard because of the concern that these solids could plug pores in the formation and reduce hydrocarbon flow rates. In some instances, operators look to brines to provide density in reservoir drilling fluids (RDFs). Brines are also applied in completion and workover fluids.

Completion fluids are those fluids used to flush potentially formation damaging materials from the wellbore after drilling and before perforation. Damaging materials include drilling fluid additives, such as fluid loss agents which may adhere to the formation face, solid cuttings and clays from formations entrained in the drilling fluid and deposited on the face of a formation, and filter cake on the formation left from the drilling fluid. The filter cake can contain solid materials from drilling fluid additive residue from the drilling fluid (depending on the oil or water base of the fluid). Completion fluids control well pressure, prevent the collapse of tubing from overpressure, and provide fluid loss control. Fluid loss control agents can be added to the bulk completion fluid or supplied as a pill. Fluid loss pills include oil-soluble resins, calcium carbonate, and ground salt.

Workover fluids are used in cleaning and repairing old wells to increase production. Completion, workover, and kill pill fluids are designed to prevent fluid from the formation intruding into the wellbore while preventing wellbore fluid leakoff. Leakoff is the loss of fluid from the wellbore into the formation. Fluid leakoff is known to cause formation damage, potentially reducing hydrocarbon recovery. Brines are used in workover fluids just as they are in RDFs and CFs to mitigate the formation damage experienced through the use of fluids with insoluble particulates, such as barite.

The required brine density and costs can drive the selection of the brine. Certain example brines, with corresponding density ranges, are listed as follows: potassium formate (8.4-13.1 pounds/gallon (lbs/gal); 63-98 lbs/ft$^3$); potassium chloride (8.3-9.7 lbs/gal; 62-73 lbs/ft$^3$); sodium chloride (8.3-10.0 lbs/gal; 62-75 lbs/ft$^3$); sodium bromide (8.4-12.5 lbs/gal; 63-93.5 lbs/ft$^3$); calcium chloride (8.4-11.8 lbs/gal; 63-88 lbs/ft$^3$); calcium bromide (8.4-14.2 lbs/gal; 63-106 lbs/ft$^3$); calcium chloride/calcium bromide mix (11.8-15.2 lbs/gal; 88-114 lbs/ft$^3$); calcium chloride/calcium bromide/zinc bromide mix (14.2-19.2 lbs/gal; 106-144 lbs/ft$^3$); zinc bromide (14.2-19.2 lbs/gal; 106-144 lbs/ft$^3$); cesium formate (15.0-19.2 lbs/gal; 112-144 lbs/ft$^3$).

Brines require viscosification in order to suspend cuttings and to help limit fluid loss to the formation. Polymers used to viscosify brines include, for example, carboxymethyl cellulose (CMC), hydroxyethyl cellulose (HEC), xanthan gum (XC), guar gum, and hydroxypropyl guar (HPG).

Fluid loss is important for brines. Polymers can be used in tandem with bridging agents to regulate fluid loss control in brines. Polymers used for fluid loss control include cross-linked starch, while the bridging agents are sized particles of calcium carbonate or salt. Calcium carbonate is available in sizes from several millimeters to several microns. These particles are readily solubilized in acid. In order for the fluids to maintain their viscosities and yield points at higher temperature, pH buffers, antioxidants and oxygen scavengers can be added. Monoethanol amine can be used as an antioxidant to protect the viscosifier by inhibiting hydroxyl radicals from degrading the polymer structure. Magnesium oxide can be added as a buffer to the pH and to inhibit hydrolysis of the polymers in the brine.

SUMMARY

Brines, for example divalent brines, have been viscosified with high performance chemical additives that raise the temperature limit for the utility of the brines as RDFs, CFs, and WFs. The present disclosure describes compositions and methods for viscosifying completion brines and reservoir drilling fluids with additives developed for high performance brine viscosification. There is substantial commercial benefit provided by brine viscosifiers with a higher temperature tolerance than is currently offered in the industry.

In one embodiment of the present disclosure, a composition includes a starch additive (for example TBC-X388 by TBC-Brinadd, LLC of Houston, Tex.) used as a viscosifier and fluid loss additive, a polysaccharide (for example TBC- X389 by TBC-Brinadd, LLC of Houston, Tex.) used as a viscosifier, a high surface area grade of magnesium oxide (MgO) (finely ground magnesia) (for example Thermasal B by TBC-Brinadd, LLC of Houston, Tex.) used as a pH buffer, a silicone defoamer (for example Antifoam HD by TBC-Brinadd, LLC of Houston, Tex.), monoethanolamine (for example TBC-X384 by TBC-Brinadd, LLC of Houston, Tex.), and sodium thiosulfate (for example Thermasal A, 100% sodium thiosulfate, by TBC-Brinadd, LLC of Houston, Tex.) used as an oxygen scavenger (also referred to as an anhydrous salt antioxidant). Monoethanolamine coordinates to calcium and reduces the hardness of brine.

In some embodiments, the starch additive may be cross-linked through functionalization with epichlorohydrin, phosphorous oxychloride, in addition to or alternative to other cross-linking agents. The starch additive is present in the brine in a concentration ranging from about 1 to about 20 pounds per barrel (PPB). The molecular weight of the starch additive can range from about 10 kiloDaltons (kD) to about 200 megaDaltons (MD). The viscosifying polysaccharide can include any one of or any combination of xanthan, succinoglycan, hydroxyethylcellulose, hydroxypropylcellulose, other cellulose derivatives, guar, hydroxypropyl guar, and other guar derivatives. The amount of polysaccharide can range from about 0% to about 1.0% by weight of the base fluid component or about 0.25 to about 5 PPB. The molecular weight of the polysaccharide can range from about 1 kDa to about 20 MDa. MgO is present, in part, to provide brine solutions with an alkaline pH (or greater than about pH 7). MgO can be present in about 0.1 to about 2.0 PPB.

In addition to the aforementioned additives, in one embodiment the composition includes bridging 2, 5, and 12 micron diameter calcium carbonates, such as, for example, Ultra Carb 2, 5, and 12 by TBC-Brinadd, LLC of Houston, Tex. These materials are specifically-sized calcium carbonate particles, which serve as acid-soluble primary bridging solids for water-based, or oil-based, drilling, completion, or workover fluids. The examples in the present disclosure demonstrate how embodiments of the compositions can increase high temperature performance of brine solutions.

A new brine viscosifier is introduced, based upon poly(diallyldimethylammonium chloride) (polyDADMAC) (for example available as Floquat TS-45 from SNF China Flocculant Co., LTD of China, Flobeads DB-45-SH, or Flodrill DB-45-CR from SNF Holding Company) associated with sodium dodecylbenzenesulfonate (SDBS) (for example available as Nacconol® 40G from Stepan Company of Northfield, Ill.). Adding further stability to the rheological structure of the fluid, a neutral polymer, such as a multi-armed polyethylene glycol (PEG) along with a polyacrylamide copolymer (such as acrylamido-tertiary-butylsulfonic acid (ATBS)-Morpholine, sometimes also referred to as 2-acrylamido-2-methylpropane sulfonic acid ("AMPS")-Morpholine copolymer) may be included in the formulation.

Therefore, disclosed here is a viscosity-retaining formulation for use in high-temperature hydrocarbon-bearing reservoir applications, where the formulation includes a brine composition; and a viscosity enhancing composition, the viscosity enhancing composition operable to enhance viscosity retention of the viscosity-retaining formulation at least, in part, through micellization, the viscosity enhancing composition comprising: a polycation composition; and an anionic surfactant composition. In some embodiments, the polycation composition comprises poly(diallyldimethylammonium chloride) (polyDADMAC). In other embodiments, the anionic surfactant composition comprises sodium dodecylbenzenesulfonate (SDBS). Still in yet other embodiments, the viscosity enhancing composition further comprises a acrylamido-tertiary-butylsulfonic acid (ATBS)-Morpholine copolymer.

In certain embodiments of the formulation, the brine composition comprises at least one component selected from the group consisting of: calcium bromide; a non-cross-linked starch additive; a cross-linked starch additive; a polysaccharide; magnesium oxide; antifoam; monoethanolamine; a bridging calcium carbonate; sodium thiosulfate; and mixtures thereof. Still in other embodiments, the formulation further comprises a fluid loss control additive. Still in other embodiments, the viscosity-retaining formulation retains about 90% of an original viscosity after heating to about 300° F.

In certain embodiments, the viscosity-retaining formulation retains about 80% of an original viscosity after heating to about 300° F. Still in other embodiments, the viscosity-retaining formulation retains between about 20% and about 60% of an original viscosity after heating to about 300° F. And in still other embodiments, the viscosity-retaining formulation retains between about 60% and about 80% of an original viscosity after heating to about 300° F. In certain embodiments, the formulation further includes a charge neutral polymer. Still yet in other embodiments, the charge neutral polymer comprises polyethylene glycol.

Additionally disclosed is a method for making a viscosity-retaining brine formulation for use in high-temperature hydrocarbon-bearing reservoir applications, where the method includes the steps of: formulating a base brine composition; and admixing with the base brine composition a viscosity enhancing composition, the viscosity enhancing composition operable to enhance viscosity retention of the viscosity-retaining brine formulation at least, in part, through micellization, the viscosity enhancing brine composition comprising: a polycation composition; and an anionic surfactant composition.

In some embodiments of the method, the polycation composition comprises poly(diallyldimethylammonium chloride) (polyDADMAC). In other embodiments of the method, the anionic surfactant composition comprises sodium dodecylbenzenesulfonate (SDBS). Still in other embodiments, the method includes the step of admixing with the formulation an acrylamido-tertiary-butylsulfonic acid (ATBS)-Morpholine copolymer. In yet other embodiments, the method includes the step of admixing with the formulation polyethylene glycol (PEG). In some embodiments, the PEG comprises multi-armed PEG.

In certain embodiments, the step of formulating a base brine composition includes the step of admixing at least one component selected from the group consisting of: calcium bromide; a non-cross-linked starch additive; a cross-linked starch additive; a polysaccharide; magnesium oxide; antifoam; monoethanolamine; a bridging calcium carbonate; sodium thiosulfate; and mixtures thereof. Still in other embodiments of the method, the method includes the step of adding a fluid loss control additive. In certain embodiments, the method includes the step of adding the viscosity-retaining brine formulation to a high-temperature hydrocarbon-bearing reservoir, where the viscosity-retaining brine formulation retains about 90% of an original viscosity after heating to about 300° F.

Still in other embodiments of the method, included is the step of adding the viscosity-retaining brine formulation to a high-temperature hydrocarbon-bearing reservoir, where the viscosity-retaining brine formulation retains about 80% of an original viscosity after heating to about 300° F. Additionally, the method can further include the step of adding the viscosity-retaining brine formulation to a high-temperature hydrocarbon-bearing reservoir, where the viscosity-retaining brine formulation retains between about 20% and about 60% of an original viscosity after heating to about 300° F. And the method can include the step of adding the viscosity-retaining brine formulation to a high-temperature hydrocarbon-bearing reservoir, where the viscosity-retaining brine formulation retains between about 60% and about 80% of an original viscosity after heating to about 300° F.

Still in other embodiments of the method, included is the step of adding the viscosity-retaining brine formulation to a high-temperature hydrocarbon-bearing reservoir, where the viscosity-retaining brine formulation retains about 80% of an original viscosity after heating to about 325° F. Additionally, the method can further include the step of adding the viscosity-retaining brine formulation to a high-temperature hydrocarbon-bearing reservoir, where the viscosity-retaining brine formulation retains between about 20% and about 60% of an original viscosity after heating to about 325° F. And the method can include the step of adding the viscosity-retaining brine formulation to a high-temperature hydrocarbon-bearing reservoir, where the viscosity-retaining brine formulation retains between about 60% and about 80% of an original viscosity after heating to about 325° F.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of compositions, systems, and methods of high performance brine viscosifiers, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
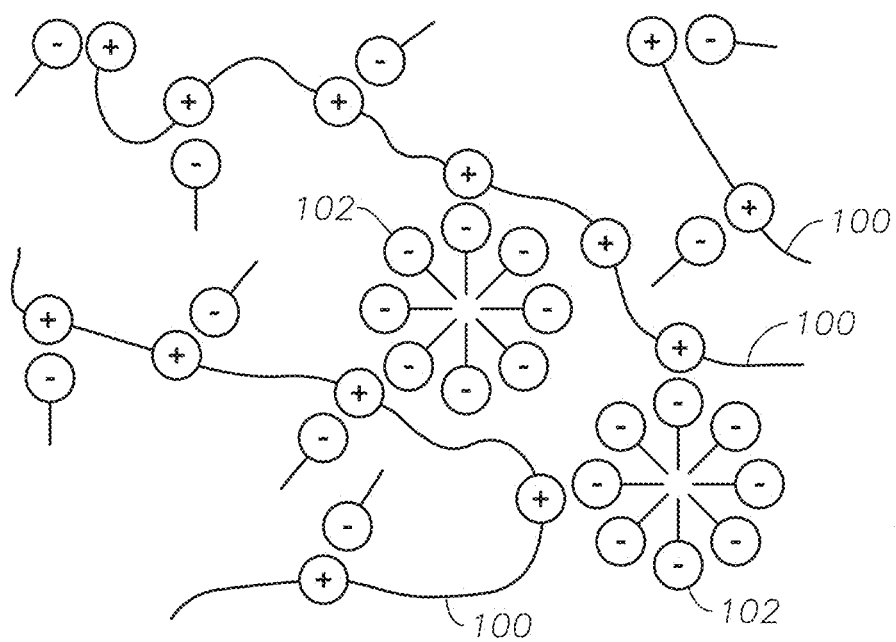
FIG. 1 shows a generalized illustration of noncovalent association (also referred to as a noncovalent complex) of a polycation with an anionic surfactant.

Referring now to FIG. 1, a generalized illustration of the association of a polycation with an anionic surfactant is shown. In certain embodiments of brine viscosifiers described here, the polycation is poly(diallyldimethylammonium chloride) polyDADMAC, optionally in a powder form, and the anionic surfactant is sodium dodecylbenzenesulfonate (SDBS). PolyDADMAC forms tight associations with anionic surfactants such as, for example, sodium dodecyl sulfate (SDS). Without being bound by any theory or principle, the structure that is formed from this association has been proposed as a "necklace and bead" type structure (in the case of SDS) as depicted in FIG. 1. Polycations 100 are intermingled with anions 102, and the association or complex formed is noncovalent in nature. SDBS likely forms a similar structure in the presence of a polycation. The association can produce a significant increase in bulk viscosity when the concentration of SDS in the solution is appropriately tuned.

Other surfactants which may be used in combination with or alternative to the synthetic polymer component (polyDADMAC) are carboxylate anion surfactants (for example, Glycolic acid ethoxylate lauryl ether and poly(ethylene glycol)), olefin sulfates, alkyl sulphates, sulfated nature oils and fats, sulfated esters, sulfated alkanolamides, alkylphenols, sulfoalkyl salts (for example, 4-nonylphenyl 3-sulfopropyl ether potassium salt), perfluoro surfactants (for example, perfluorooctanesulfonate, perfluorobutanesulfonate, perfluorononate), alkyl-aryl ether phosphates, alkyl ether phosphates, and docusate salts.

Alternatively and additionally, anionic polymers can be used when coupled with cationic surfactants. Anionic polymers include polystyrene sulfonate, polymethacrylates, polyphosphonates and polycarboxylates. Surfactants which may be used in combinations with anionic synthetic polymers are quaternary ammonium salts, amines with amide linkages, polyoxyethylene alkyl and alicyclic amines, N,N,N',N' tetrakis substituted ethylenediamines, and 2-alkyl-1-hydroxethyl-2-imidazolines. Examples include cetrimonium bromide (CTAB), cetylpyridium chloride (CPC), benzalkonium chloride (BAC), benzethonium chloride (BZT), methylbenzethonium chloride, dimethyl dioctadecylammonium chloride and dioctadecyldimethylammonium bromide (DODAB).

The following experiments describe methods and compositions for increasing the viscosity of drilling fluids, such as, for example, completion brines and reservoir drilling fluids and for extending the performance window of the brines up to about 300° F. and greater. The experiments also show methods and compositions for increasing the particle suspendability of drilling fluids.

Experiment A

Experiment A was a study of the temperature tolerance of polyDADMAC and polyDADMAC/SDBS viscosifiers in 14.2 pounds per gallon (PPG) CaBr2 brines, which were formulated as fluids containing components of a reservoir drilling fluid, with the exception of the fluid loss control additive. A fluid loss control additive polymer was intentionally left out so that the change in viscosity after heating the brines to 300° F. for 16 hours could be attributed primarily to degradation of the viscosifier and not the fluid loss polymer.

Monoethanolamine was mixed with the CaBr2 brine prior to the addition of any other additives. Then, calcium carbonate bridging agents, sodium thiosulfate (as an oxygen scavenger), and MgO (as the pH buffer), along with an anti-foaming additive were added to the CaBr2 and monoethanolamine solution and blended for five minutes. Then, the polyDADMAC, polysaccharide viscosifier, or SDBS were added and blended for 35 minutes.

After blending, the samples were placed in cans for the roller oven and pressurized to 500 pounds per square inch (psi). The samples were hot rolled at 150° F. for 16 hours. The rheology was measured in a Grace Instruments 5600 high pressure high temperature (HPHT) rheometer. The samples were then placed in the roller oven in cans pressurized to 500 psi and left static for 16 hours. The rheologies of the samples were then measured again and compared with the previous rheologies to determine the effect of heating on the viscosity of the fluids. The formulations for these experiments are shown in Tables 1 and 2.

TABLE 1

Initial sample formulation for reservoir drilling fluid samples A-1, A-2, and A-3 for testing viscosity increasing additives.

| Name | Amount | Units |
|---|---|---|
| Monoethanolamine | 10.0 | mL |
| Calcium Carbonate - 2 micron diameter | 10.0 | grams |

TABLE 1-continued

Initial sample formulation for reservoir drilling fluid samples A-1, A-2, and A-3 for testing viscosity increasing additives.

| Name | Amount | Units |
|---|---|---|
| Calcium Carbonate - 5 micron diameter | 10.0 | grams |
| Calcium Carbonate - 12 micron diameter | 10.0 | grams |
| Magnesium Oxide | 5.0 | grams |
| Silicone Defoamer | 2.0 | grams |
| Sodium Thiosulfate | 2.0 | grams |
| $CaBr_2$ brine | 320 | mL |

TABLE 2

Additive types and amounts for samples A-1, A-2, and A-3 for testing increased viscosity.

| | Additive | Amount |
|---|---|---|
| Sample A-1 | Polysaccharide viscosifier | 8.3 mL |
| Sample A-2 | polyDADMAC | 12.0 grams |
| Sample A-3 | polyDADMAC/SDBS | 12.0 grams/2.0 grams |

The formulations in Experiment A were designed to test the stability of the viscosifiers in a reservoir drilling fluid. Experiment A examined the viscosifier, without taking into account the stability of the fluid loss additive. The results of Experiment A are displayed in FIGS. 2-4.

Figure 2:
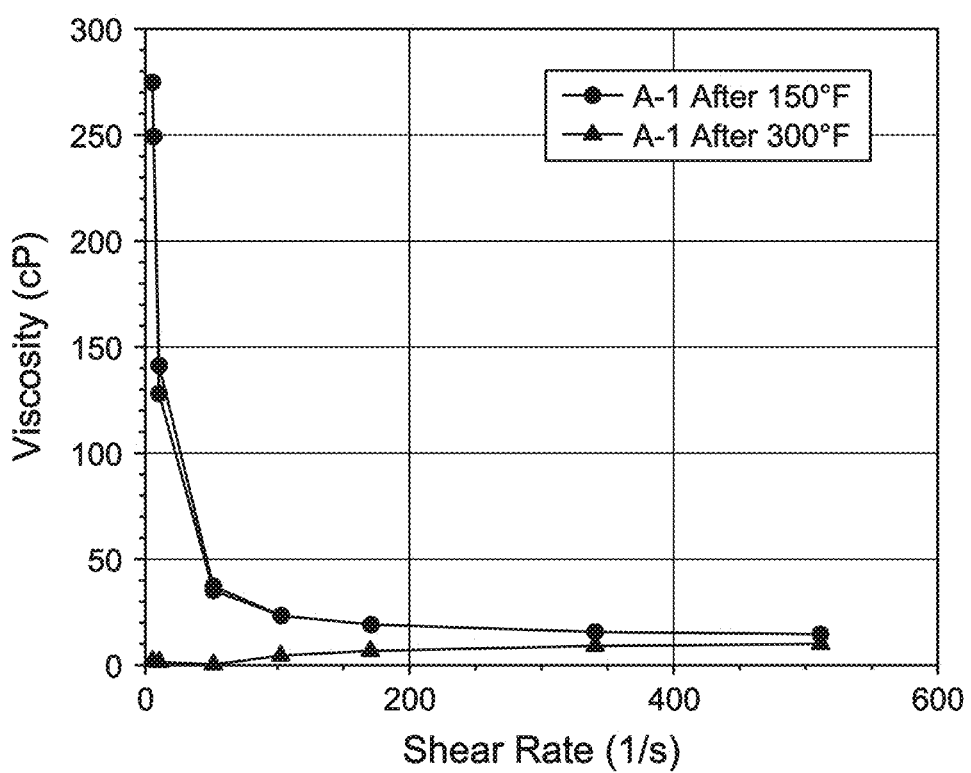
FIG. 2 shows a graph for the results of the measured viscosity of sample A-1 in Experiment A.

Referring now to FIG. 2, a graph is shown for the results of the measured viscosity of sample A-1 in Experiment A. The A-1 CaBr2 brine exhibits a high low-shear viscosity after the initial 16 hour 150° F. hot roll. After heating the brine to 300° F. and static aging for 16 hours, the brine displays almost no viscosity at shear rates of 100 s$^{-1}$ and less. The high shear viscosity, on the other hand, increases with shear rate after the 300° F. static aging. A-1 becomes a shear thickening fluid after the static aging. Before 300° F. the fluid was shear thinning, as desired for the application.

Figure 3:
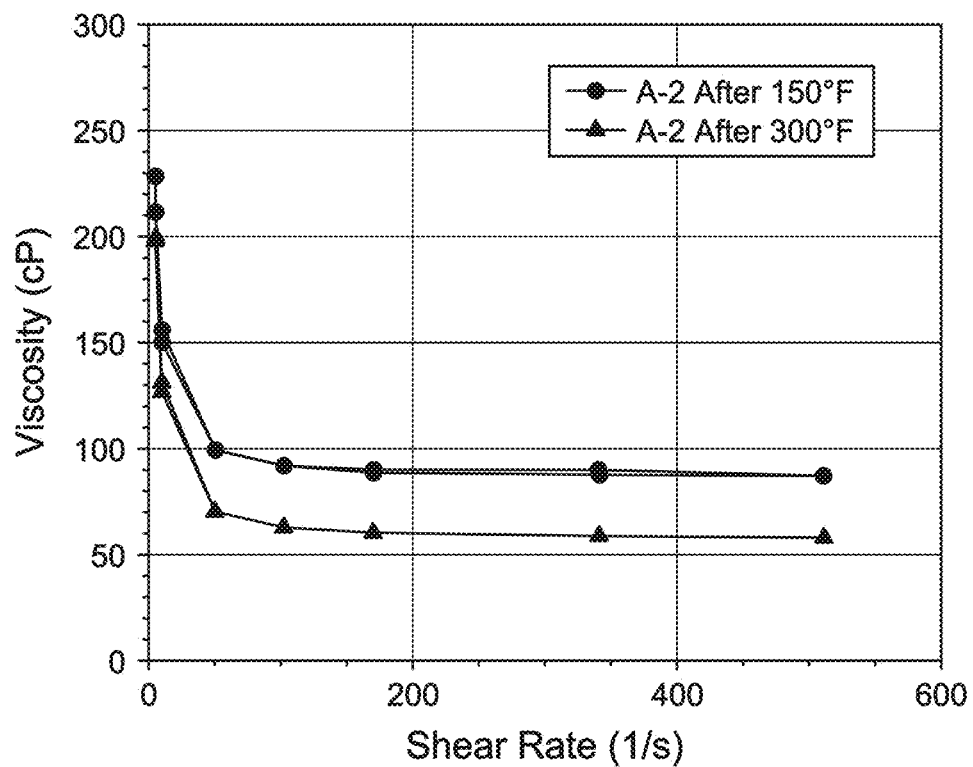
FIG. 3 shows a graph for the results of the measured viscosity of sample A-2 in Experiment A.
Figure 4:
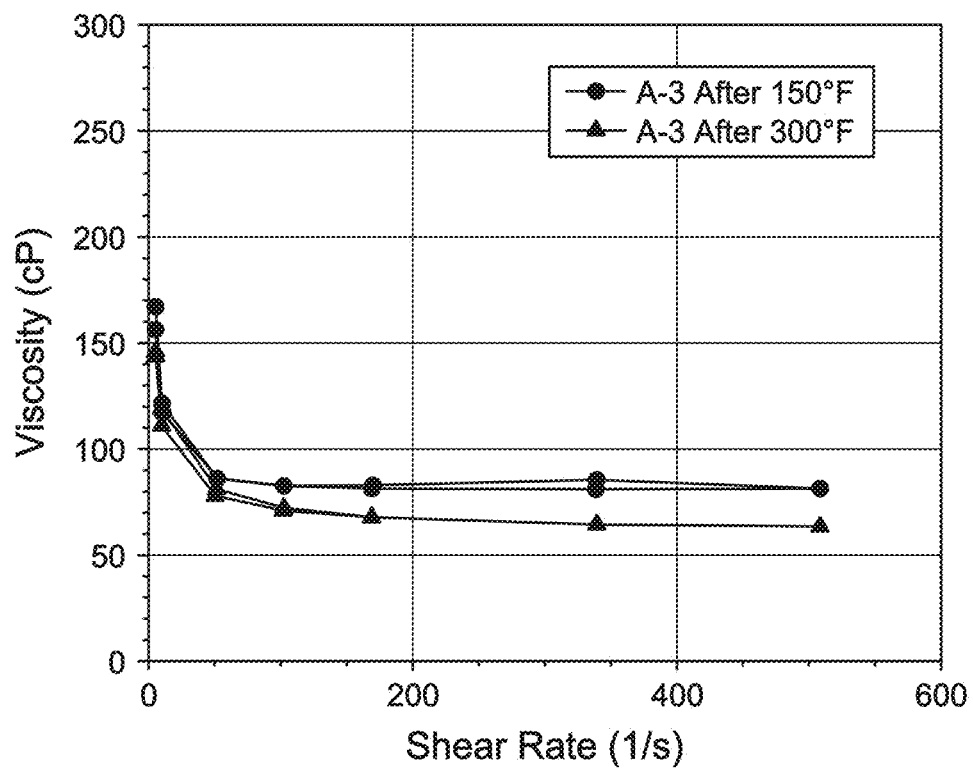
FIG. 4 shows a graph for the results of the measured viscosity of sample A-3 in Experiment A.

FIG. 3 shows a graph for the results of the measured viscosity of sample A-2 in Experiment A. FIG. 4 shows a graph for the results of the measured viscosity of sample A-3 in Experiment A. Unlike the sample A-1 brine, the sample A-2 and sample A-3 CaBr2 brines are shear thinning before and after static aging at 300° F. Additionally, the viscosity retained across all shear rates (except for 500 l/s in the case of A-2) is substantially higher for both A-2 and A-3. A-3 displays the best retention of viscosity after the 300° F. static aging experiment.

Figure 5:
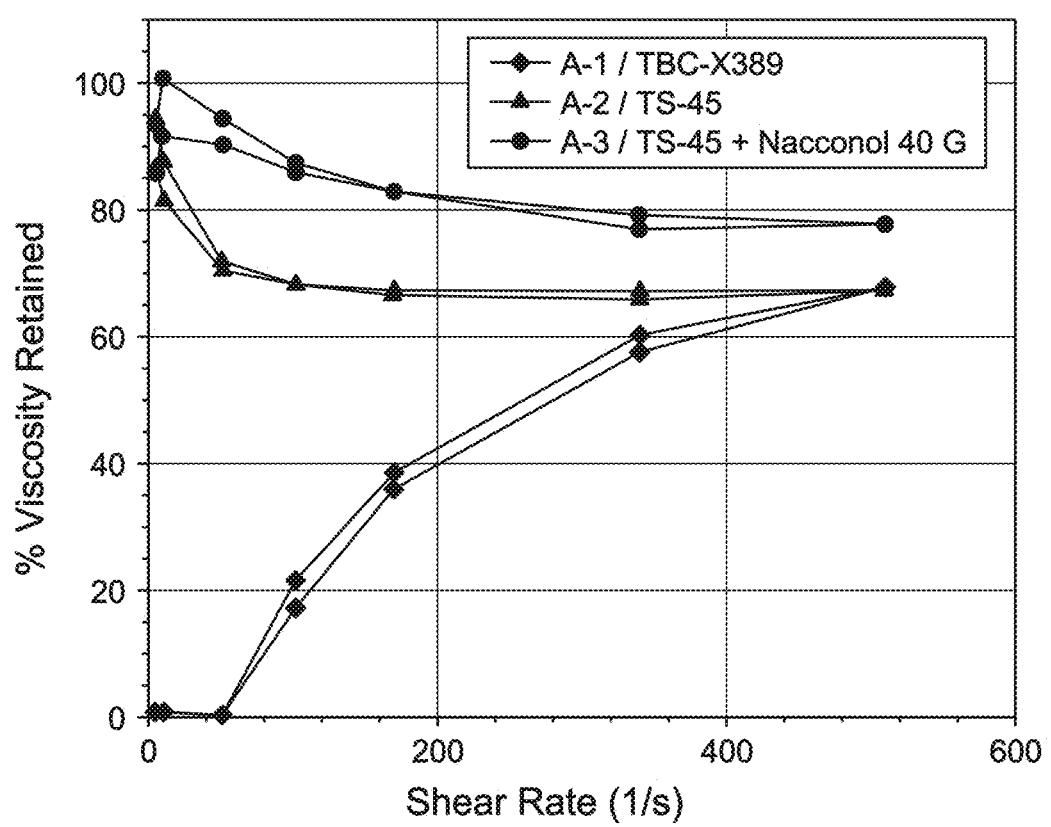
FIG. 5 shows a graph for the percent viscosity retained as a function of shear rate for the three different fluids tested in Experiment A.

The percent viscosity retention is displayed in FIG. 5 as a function of shear rate for the three different fluids. FIG. 5 shows for samples A-1, A-2, and A-3, the percent viscosity retained after 16 hours of static aging at 300° F. The average percent viscosities retained across all shear rates tested for A-1, A-2, and A-3 are 23%, 74%, and 87%, respectively.

Sample A-1 is the sample containing polysaccharide viscosifier as the viscosifier. The polysaccharide viscosifier is used in multivalent brines in high temperature wells as a reservoir drilling fluid, with a maximum recommended temperature of about 260° F. Samples A-2 and A-3 do not contain this viscosifier. Sample A-2 contains a polyDADMAC polymer and sample A-3 contains a polyDADMAC polymer complexed to a sodium dodecylbenzenesulfonate (SDBS) surfactant. Without being bound by any theory or principle, the increase in viscosity and fluid stability in sample A-3 is believed to arise, in part, from a supramolecular, micellar association of the polymer strands with one another through the micellization of the surfactant.

Experiment B

Experiment B compares a series of 11.6 PPG CaCl$_2$ brines which differ according to the viscosifier used and the amount of monoethanolamine used. The retention in viscosity for these brines was determined following aging at a temperature of 300° F. for 16 hours. In experiment B, all of the components in Table 3 were blended for five minutes prior to the addition of the viscosifying additives listed in Table 4. After the addition of all components to the brines, the brines were blended for an additional 30 minutes. Each of the samples were then hot rolled under 500 psi in a roller oven set to 150° F. The rheologies for these brines were determined after 16 hours and after having cooled to room temperature. The rheometer used for these measurements was a Fann 35. Then samples were then placed back in the oven at 500 psi and heated to 300° F. They were static aged for 16 hours at 300° F.

TABLE 3

Initial sample formulations for reservoir drilling fluid samples B-1 through B-6 for testing viscosity increasing additives.

| Name | Amount | Units |
|---|---|---|
| Cross-linked Starch | 8.0 | grams |
| Calcium Carbonate - 2 Micron | 10.0 | grams |
| Calcium Carbonate - 5 Micron | 10.0 | grams |
| Calcium Carbonate - 12 Micron | 10.0 | grams |
| Magnesium Oxide | 5.0 | grams |
| Silicone defoamer | 2.0 | grams |
| Sodium Thiosulfate | 2.0 | grams |
| CaCl$_2$ brine | 320 | mL |

TABLE 4

Viscosifying additives added to samples B-1 through B-3.

| | Additive | Amount |
|---|---|---|
| Sample B-1 | Xanthan | 8.3 mL |
| | Monoethanol amine | 5 mL |
| Sample B-2 | polyDADMAC | 12.0 grams |
| | Monoethanol amine | 5 mL |
| Sample B-3 | polyDADMAC/ sodium dodecyl benzene sulfonate | 12.0 grams/12.0 grams |
| | Monoethanol amine | 5 mL |
| Sample B-4 | Xanthan | 8.3 mL |
| | Monoethanol amine | 10 mL |
| Sample B-5 | polyDADMAC | 12.0 grams |
| | Monoethanol amine | 10 mL |
| Sample B-6 | polyDADMAC/ sodium dodecyl benzene sulfonate | 12.0 grams/12.0 grams |
| | Monoethanol amine | 10 mL |

Figure 6:
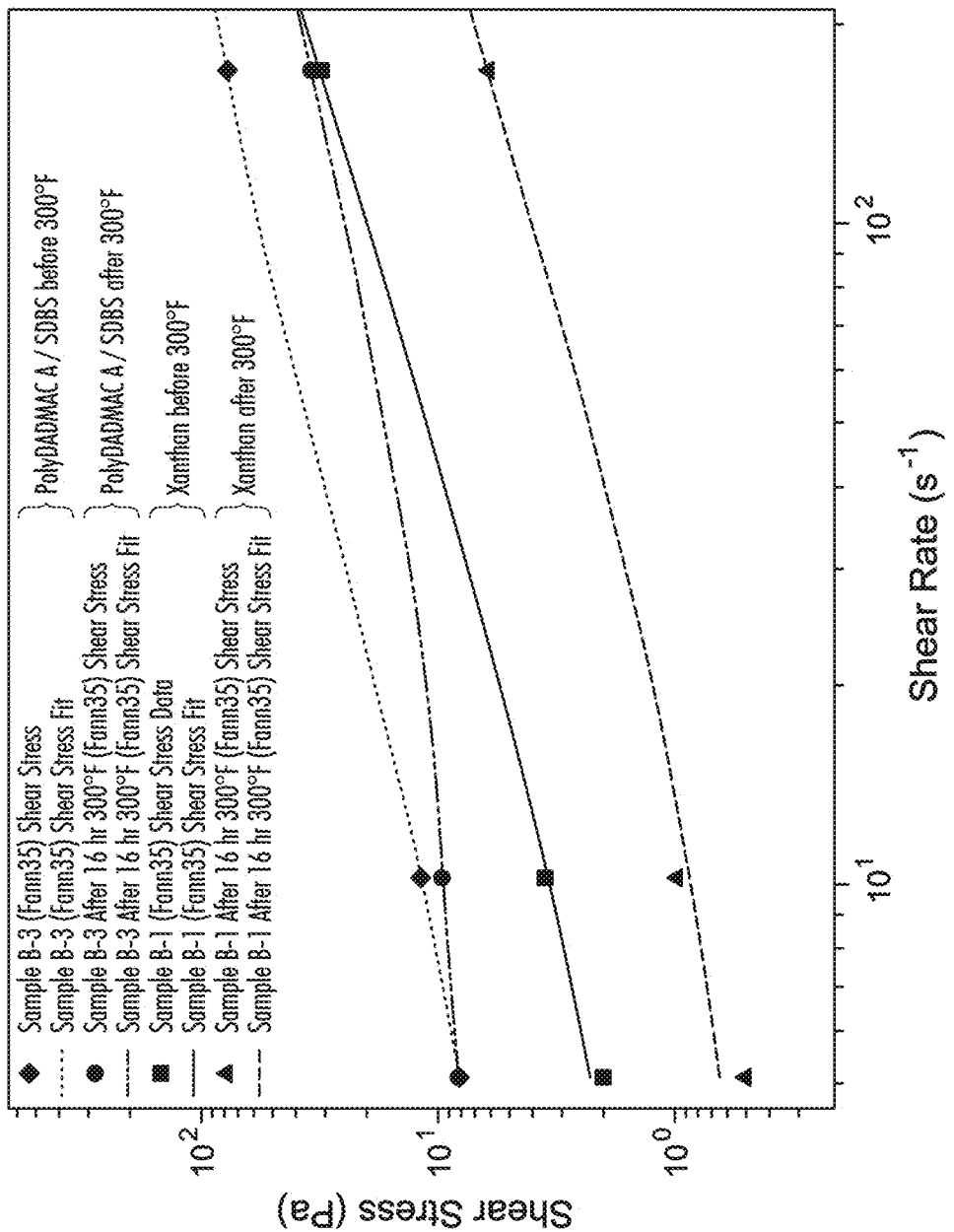
FIG. 6 shows a graph of the comparison of shear responses for samples B-1 and B-3 before and after static aging at 300° F. (149° C.).
Figure 7:
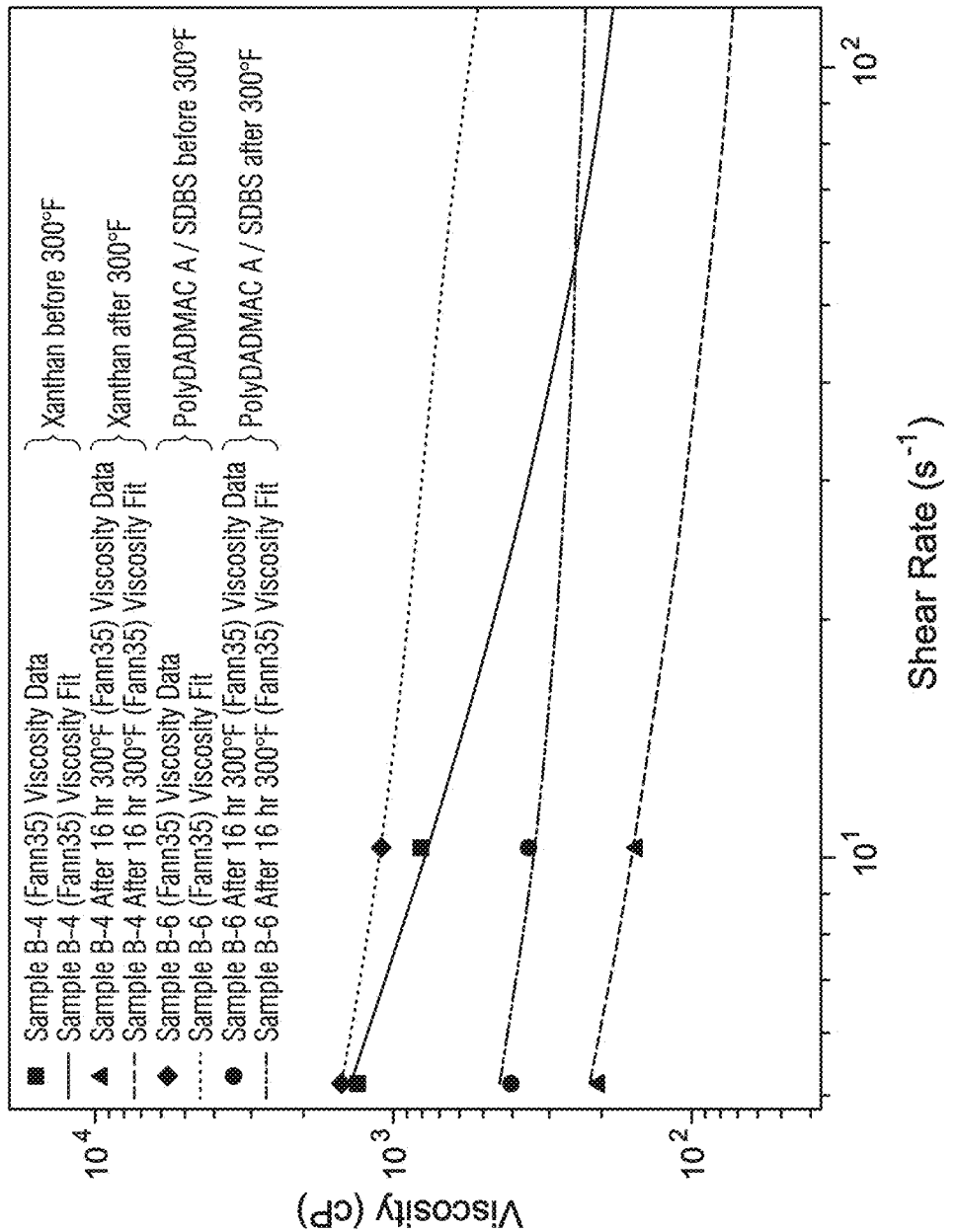
FIG. 7 shows a graph of the comparison of shear responses for samples B-4 and B-6 before and after static aging at 300° F. (149° C.).
Figure 8:
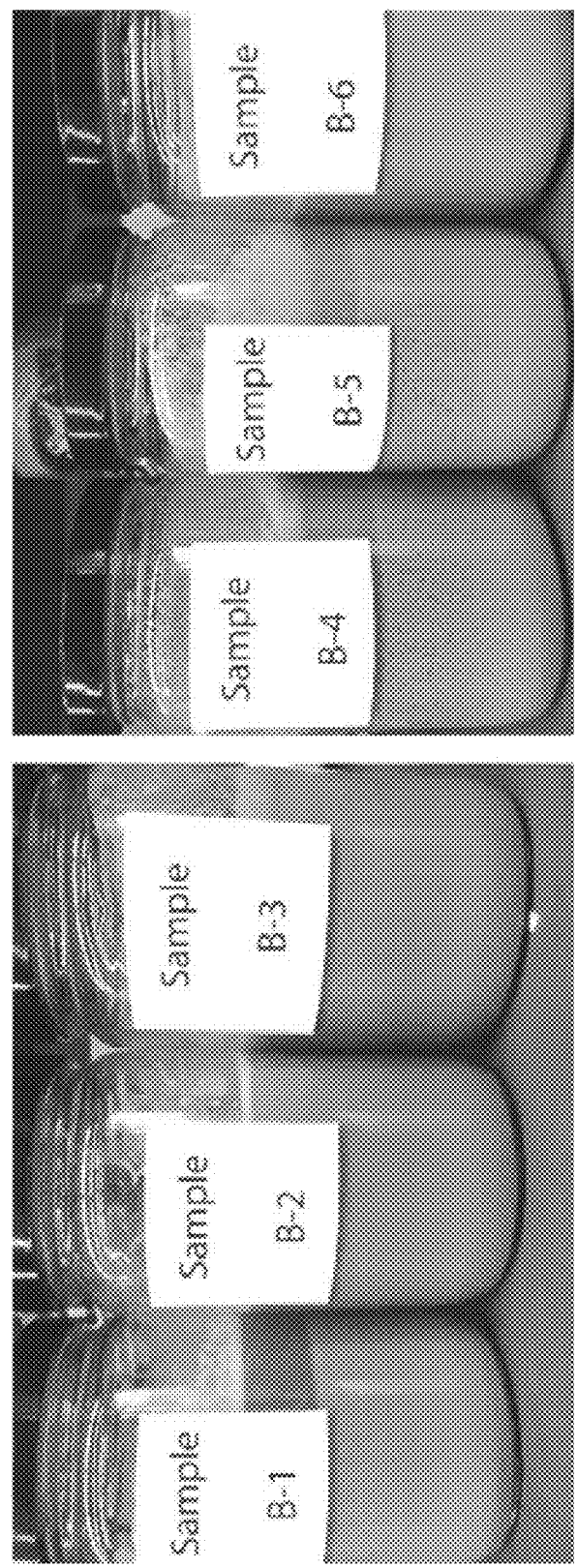
FIG. 8 shows a pictorial representation of Samples B-1 through B-6 from left to right from Experiment B after heating to 300° F.

Samples B-1 and B-4 contain xanthan as the viscosifier. Samples B-2 and B-5 are the samples containing polyDADMAC as the viscosifier. Samples B-3 and B-6 are the samples containing polyDADMAC and SDBS as the viscosifiers. Samples B-3 and B-6 show the best suspension stability over the others in addition to showing superior viscosity retention after the 300° F. (149° C.) static aging test, as shown by FIGS. 6-8.

In this experiment, the polyDADMAC/SDBS combination for the viscosifier gave the best results for the brines ability to suspend solids. Samples 3 and 6 showed the best suspension stability after the 300° F. (149° C.) static aging step. The other samples settled relatively quickly after the aging step. Table 5 gives a tabulation of the calculated yield points and plastic viscosities of the brine formulations tested in Experiment B. Samples 3 and 6 had about 42% plastic viscosity recovery after the 300° F. (149° C.) static aging test. Sample B-3 had a calculated yield point of 1.9 pound-foot (lbf)/100 ft$^2$ after the static aging. This is 21% of the original yield point which was calculated to be 9.3 lbf/100 ft$^2$. Sample B-6 had 31% plastic viscosity recovery and a calculated yield point of 2.2 lbf/100 ft$^2$ after static aging (Table 5).

Samples B-3 and B-6 did not show settling behavior. This indicates the greater stability of the brine solutions with SDBS and polyDADMAC in comparison with the other formulations tested in this experiment. The greater solids suspending ability of the SDBS and polyDADMAC after the static 300° F. (149° C.) test indicates that this formulation has advantages over the xanthan formulation or a formulation of polyDADMAC in the absence of surfactant (for example SDBS or SDS).

TABLE 5

Yield points and plastic viscosities for Experiment B.

| Sample B# | Best Fit | Yield Point (lbf/100 * ft$^2$) | Plastic Viscosity (cP) | % Recovery Yield Point | % Recovery Plastic Viscosity |
|---|---|---|---|---|---|
| 1 (before 300° F.) | Polynomial | 15.4 | 110.9 | 5.3 | 27.2 |
| 1 (after 300° F.) | Hershel-Bulkley | 0.8 | 30.2 | | |
| 2 (before 300° F.) | Polynomial | 16.4 | 18 | 2.6 | 700.7 |
| 2 (after 300° F.) | Polynomial | 0.4 | 126.1 | | |
| 3 (before 300° F.) | Polynomial | 9.3 | 321 | 20.9 | 42.3 |
| 3 (after 300° F.) | Hershel-Bulkley | 1.9 | 135.6 | | |
| 4 (before 300° F.) | Polynomial | 13.4 | 100.1 | 7.5 | 36.7 |
| 4 (after 300° F.) | Hershel-Bulkley | 1.0 | 36.8 | | |
| 5 (before 300° F.) | Polynomial | 11.0 | 110.7 | 20.1 | 41.0 |
| 5 (after 300° F.) | Polynomial | 2.2 | 45.4 | | |
| 6 (before 300° F.) | Polynomial | 8.2 | 291 | 27.1 | 30.7 |
| 6 (after 300° F.) | Windhab | 2.2 | 89.5 | | |

A comparison of the shear responses of samples B-1 and B-3 before and after static aging at 300° F. (149° C.) (FIG. 6) show that sample B-1 had significantly more thinning than sample B-3, both in terms of plastic viscosity and yield point. Sample B-1 is the standard brine viscosified with xanthan and cross-linked starch. Sample B-3 is the sample with polyDADMAC/SDBS and cross-linked starch. In this case, polyDADMAC/SDBS is a direct replacement for xanthan. The presence of this additive in the formulation endows the fluid, B-3, with greater resistance to thermal degradation.

Samples B-4 through B-6 are virtually identical to samples B-1 through B-3, the only difference is that the amount of monoethanol amine is doubled in samples B-4 through B-6. FIG. 7 shows a similar effect where sample B-6, which is viscosified with polyDADMAC/SDBS and cross-linked starch, displays greater resistance to thermal degradation over sample B-4, which is viscosified with xanthan and cross-linked starch. Of particular importance is the reduced thermal degradation in B-6 and B-3 in viscosities at low shear rate.

Experiment C

To further reduce the sensitivity of example formulations to further thermal degradation, cross-linked starch can be replaced when a suitable synthetic polymer is selected. Experiment C highlights the advantages to the resulting formulations. Experiment C tests a synthetic fluid loss control additive in a brine formulation containing the polyDADMAC/SDBS viscosifier. Experiment C demonstrates that the ATBS-Morpholine copolymer fluid loss additive has superior viscosity retention after the 16 hour static aging step in comparison to the polyDADMAC/SDBS with the cross-linked starch fluid loss control additive. The formulations are presented in Table 6.

In Experiment C, monoethanol amine was mixed with the CaBr2 brine prior to the addition of any other additives. The calcium carbonate bridging agents, sodium thiosulfate, and MgO along with an anti-foaming additive were added to the CaBr2 and monoethanol amine solution and blended for five minutes. The fluid loss control polymer (either cross-linked starch, ATBS-Morpholine copolymer, or a blend thereof) was then added and blended in briefly. Then, finally, the polyDADMAC, xanthan viscosifier, or SDBS were added and blended for 35 minutes.

TABLE 6

Formulations in Experiment C.

| Name | Amount | Units | Sample | Additive | Amount |
|---|---|---|---|---|---|
| Monoethanol amine | 10.0 | mL | C-1 | ATBS-Morpholine copolymer | 16.0 grams |
| polyDADMAC A | 12.0 | grams | | | |
| SDBS | 2.0 | grams | | | |
| Calcium Carbonate - 2 Micron | 10.0 | grams | C-2 | ATBS-Morpholine copolymer | 4.0 grams |
| Calcium Carbonate - 5 Micron | 10.0 | grams | | Cross-linked starch | 4.0 grams |
| Calcium Carbonate - 12 Micron | 10.0 | grams | C-3 | Cross-linked starch | 8.0 grams |
| Magnesium Oxide | 5.0 | grams | | | |
| Silicone defoamer | 2.0 | grams | | | |
| Sodium Thiosulfate | 2.0 | grams | | | |
| CaBr$_2$ brine | 320 | mL | | | |

Experiment C demonstrates that the fluid loss additive, an ATBS-Morpholine copolymer retains substantially more viscosity after the 16 hour static aging step than the commercially available viscosifier product (with polysaccharide viscosifier and fluid loss control additive).

Figure 9A:
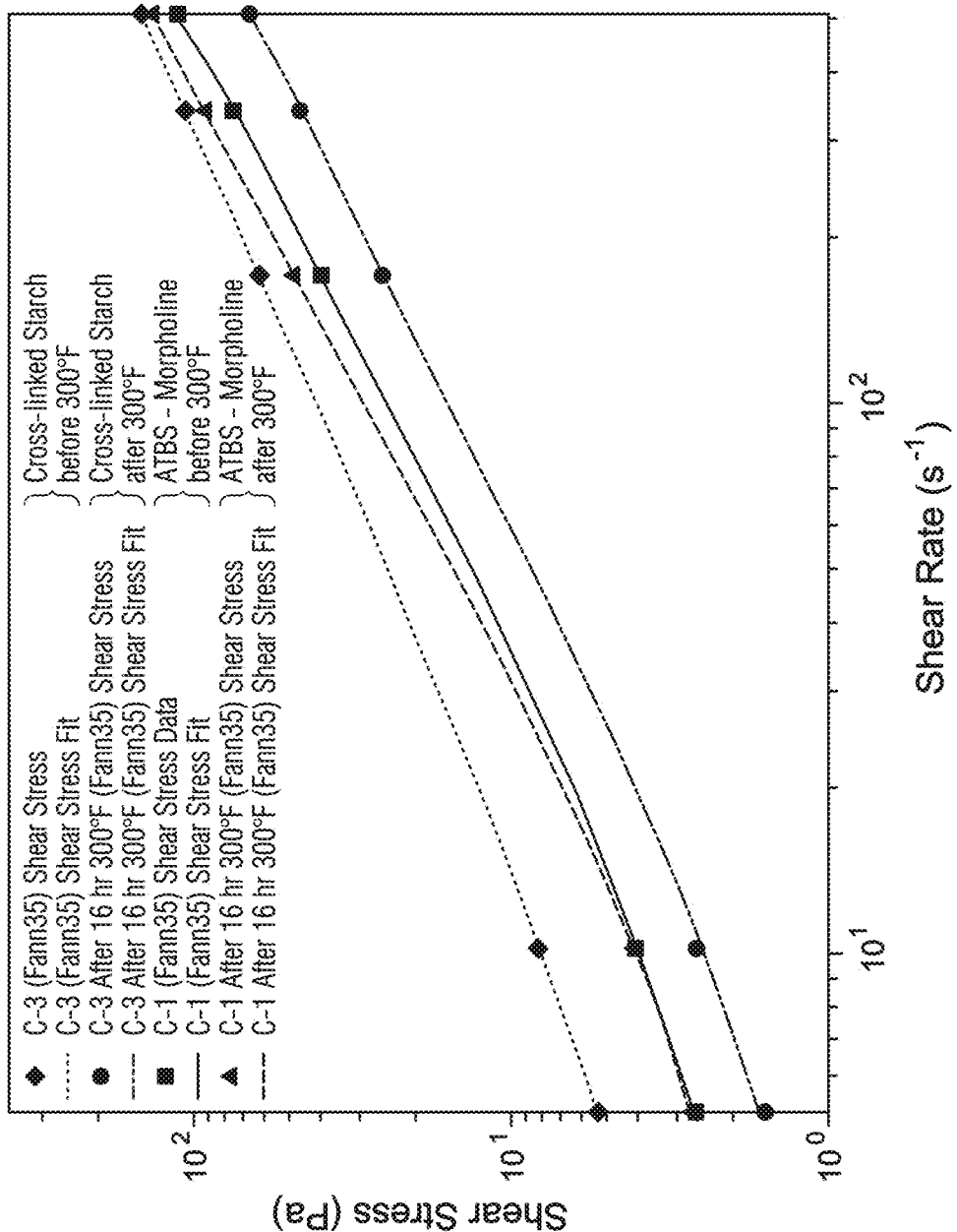
FIGS. 9A and 9B show graphs for the shear stress dependence on shear rate for three different samples (C-1, C-2, and C-3) before and after static aging at 300° F. (149° C.) for 16 hours.

Sample C-1 contains 16 grams of ATBS-Morpholine copolymer in a 320 ml CaBr2 brine. Sample C-2 contains 4.0 grams of ATBS-Morpholine copolymer and 4.0 grams of cross-linked starch. Sample C-3 contains 8.0 grams cross-linked starch as the fluid loss components. Table 7 has the calculated plastic viscosities and yield points of the samples tested. As can be seen in FIG. 9A, Sample C-1 had the greatest retention of rheological properties with an average retention of viscosity of 91% after the 300° F. (149° C.) static aging step.

Figure 9B:
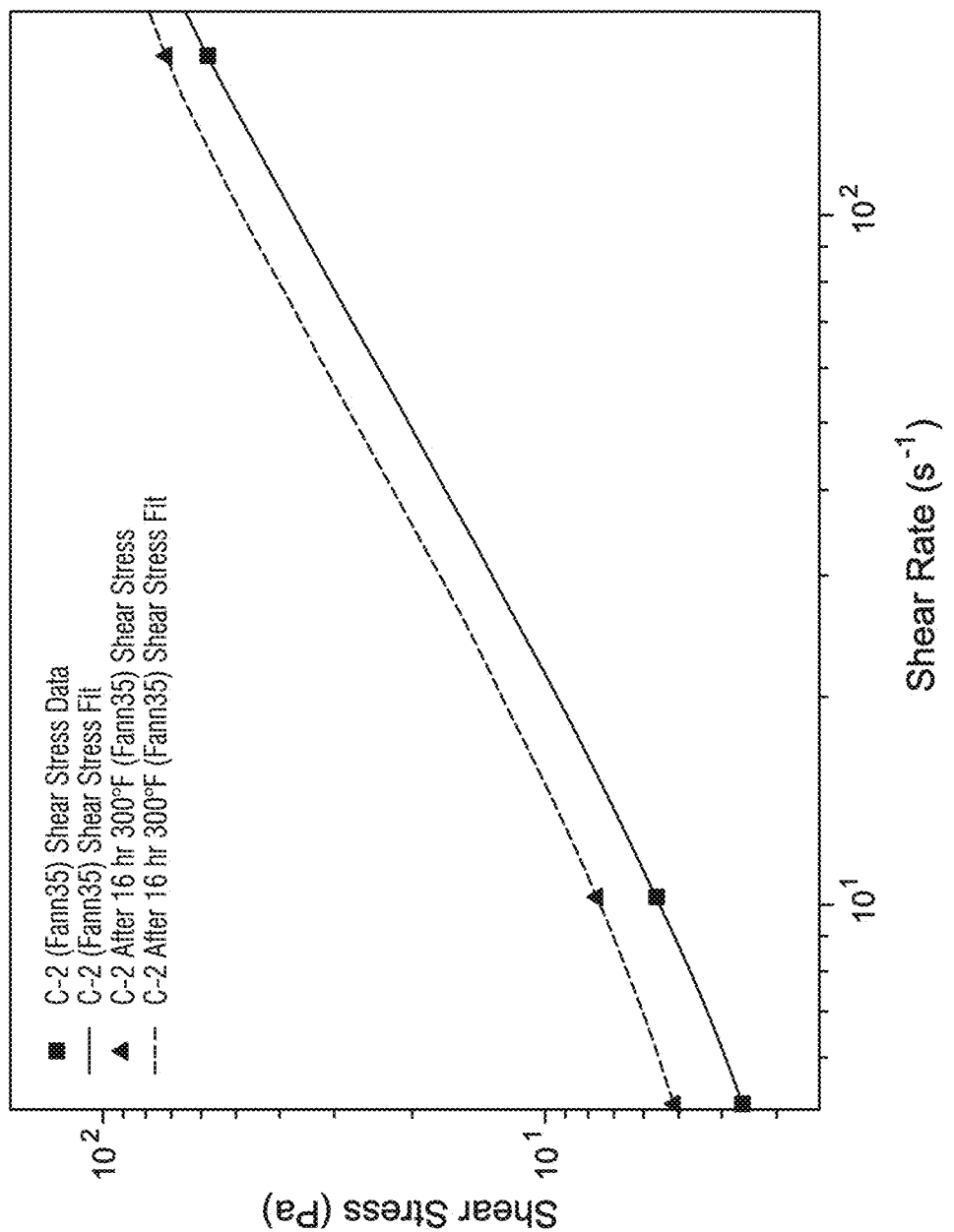

Sample C-2 (FIG. 9B), which contains a 1:1 blend of synthetic polymer and derivatized starch for the fluid loss control retains 15% of its plastic viscosity after the static aging step and at 170% is calculated to have a higher yield point than prior to the 300° F. (149° C.) aging step. This extrapolation can be supplemented with a qualitative analysis of the shear responses depicted in FIGS. 9A and 9B. C-1 shows little perturbation in shear response before and after 300° F. (149° C.). Sample C-3 retains 56% of its plastic viscosity after the static aging test. The low shear viscosities are the highest for sample C-1 as compared to samples C-2 and C-3. The sample labeled C-3 had the worst viscosity retention of the samples in this experiment and is the brine which contains xanthan for the viscosifier (instead of the polyDADMAC/SDBS blend) and contains cross-linked starch for the fluid loss control.

TABLE 7

Yield points and plastic viscosities for Experiment C.

| Sample C# | Best Fit | Yield Point (lbf/100 * ft²) | Plastic Viscosity (cP) | % Recovery Yield Point | % Recovery Plastic Viscosity |
|---|---|---|---|---|---|
| C-1 | Polynomial | 2.4 | 59.4 | 125.1 | 363.3 |
| C-1 After 16 hr 300° F. | Polynomial | 3.0 | 215.8 | | |
| C-2 | Polynomial | 3.1 | 294 | 169.1 | 15.3 |
| C-2 After 16 hr 300° F. | Polynomial | 5.3 | 45 | | |
| C-3 | Hershel-Bulkley | 3.3 | 218.3 | 51.1 | 55.6 |
| C-3 After 16 hr 300° F. | Polynomial | 1.7 | 121.4 | | |

Experiment D

The effect of a acrylamido-tertiary-butylsulfonic acid (ATBS)-Morpholine copolymer on brine stability at high temperature was tested. Experiment D tested a synthetic fluid loss control additive in a brine formulation containing the polyDADMAC/SDBS viscosifier in a 14.2 PPG CaBr2 brine. Experiment D demonstrated that the fluid loss additive, FL-18 (which is an ATBS-Morpholine copolymer provided by Fritz Industries, Inc. of Mesquite, Tex.) has superior viscosity retention after the 16 hour static aging step in comparison to the polyDADMAC/SDBS with the cross-linked starch fluid loss control additive.

The ATBS-Morpholine copolymer has a molecular weight range between about 1 kD and about 2 MD and is added to the brine solutions in a concentration of between about 0.1% and about 10% by weight. Other polymers which may be used in place of or in addition to ATBS-Morpholine copolymer are alkyl-substituted ATBS acrylamide polymers, ATBS-N-vinyl pyrrolidone, vinylsulfonate copolymers, acrylates, N-vinyl-N-methylacetamide, hydrolyzed polyacrylonitrile, and mixtures thereof.

Experiment D builds further on the results from Experiment C by extending the formulations to two other kinds of polyDADMAC polymers (Table 8). These are depicted as polyDADMAC B and C. PolyDADMAC B and C have roughly the same molecular weight as polyDADMAC A but they differ in the way that they were synthesized. PolyDADMAC C is a branched polyDADMAC, while A and B are linear. These brines show a partial replacement of cross-linked starch by the ATBS-Morpholine copolymer and a 4-armed polyethylene glycol (PEG) in Samples D-1 and D-4. Sample D-2 replaces the cross-linked starch only with a 4-armed PEG. Sample D-3 is the standard xanthan/cross-linked starch benchmark.

TABLE 8

Formulations for Experiment D.

| Name | Amount | Units | Sample | Additive | Amount |
|---|---|---|---|---|---|
| Monoethanol amine | 4.0 | mL | D-1 | ATBS-Morpholine copolymer | 6.0 grams |
| Calcium Carbonate - 2 Micron | 10.0 | grams | | polyDADMAC B | 18.0 grams |
| Calcium Carbonate - 5 Micron | 10.0 | grams | | SDBS | 3.0 grams |
| | | | | 4-armed PEG | 16.0 grams |
| Calcium Carbonate - 12 Micron | 10.0 | grams | | Cross-linked starch | 3.0 grams |
| | | | D-2 | polyDADMAC B | 18.0 grams |
| Magnesium Oxide | 5.0 | grams | | SDBS | 3.0 grams |
| Silicone defoamer | 2.0 | grams | | 4-armed PEG | 16.0 grams |
| Sodium Thiosulfate | 2.0 | grams | | Cross-linked starch | 8.0 grams |
| CaBr₂ brine | 320 | mL | D-3 | Xanthan | 8.3 mL |
| | | | | Cross-linked starch | 8.0 grams |
| | | | D-4 | ATBS-Morpholine copolymer | 6.0 grams |
| | | | | polyDADMAC C | 18.0 grams |
| | | | | SDBS | 3.0 grams |
| | | | | 4-armed PEG | 16.0 grams |
| | | | | Cross-linked starch | 3.0 grams |

Figure 10:
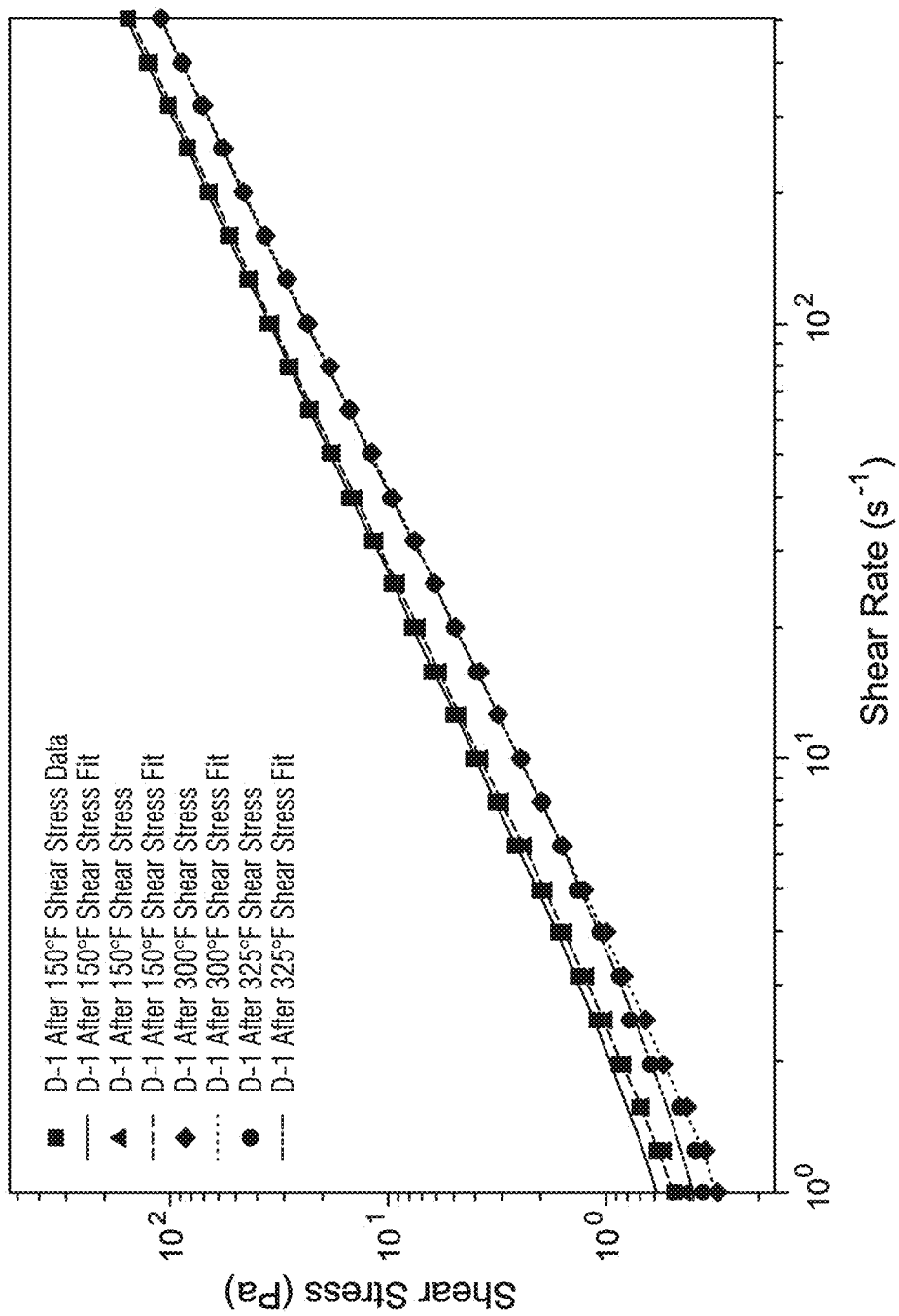
FIG. 10 is a graph showing the shear response of formulation D-1 which contains polyDADMAC B and SDBS along with ATBS-Morpholine and a 4-armed PEG.

FIG. 10 shows that the polyDADMAC B does not have the same viscosifying power as polyDADMAC A as observed in Experiments A through C. Nevertheless, the polymers show better temperature resilience than the xanthan/cross-linked starch system (D-3). Interestingly, the low shear viscosity of D-1 exposed to 325° F. (163° C.) is higher than that of the 300° F. sample. So while there is thermal degradation at 300° F. (149° C.), the degradation at 325° F. (163° C.) is not significantly higher and in fact, there appears to be some recovery in the yield point values.

Figure 11:
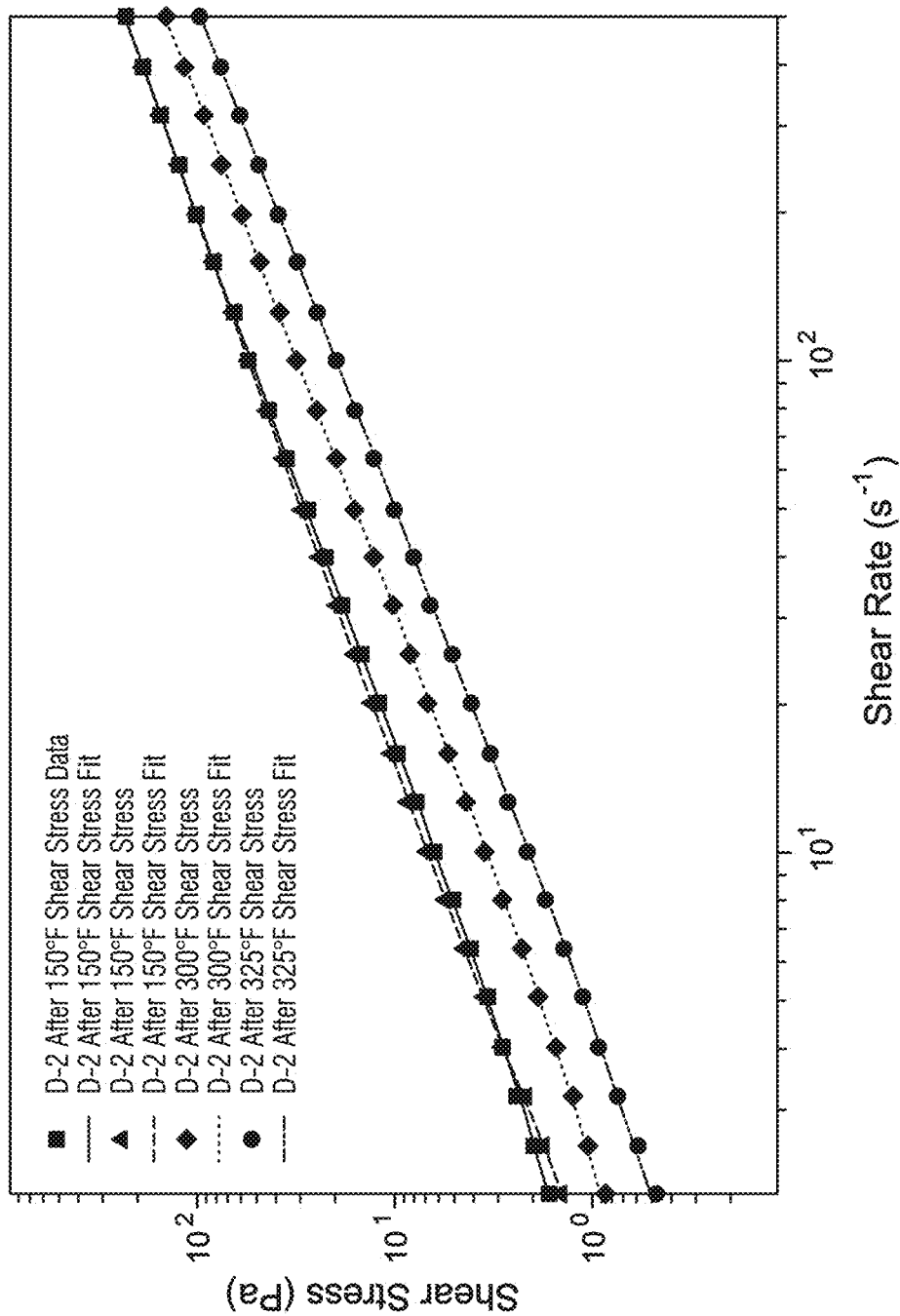
FIG. 11 is a graph showing the rotational shear response of formulation D-2, containing cross-linked starch and polyDADMAC B.
Figure 12:
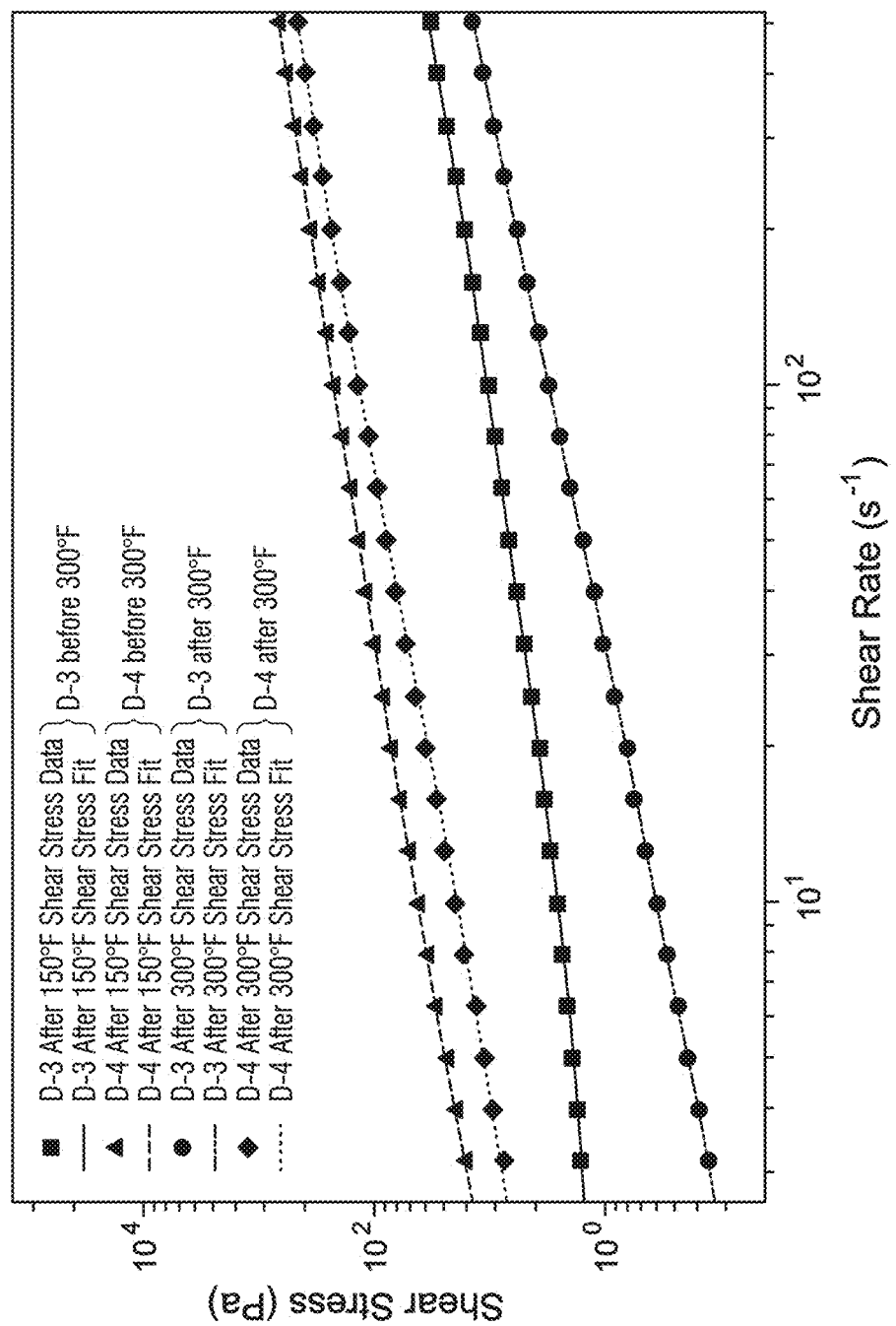
FIG. 12 is a graph showing a shear response comparison of the standard xanthan/cross-linked starch brine (D-3) with a brine containing a cross-linked polyDADMAC and SDBS (D-4) before and after static aging at 300° F. (149° C.).

FIG. 11 shows that there is a significant decrease in shear response after 300° F. and a significantly larger decrease in shear response after 325° F. (163° C.). The cross-linked starch component degrades at these temperatures affecting the performance of the brine on the whole. In any case, for both the brines D-1 and D-2, the polyDADMAC (polyDAD- MAC B) used did not impart a substantial enough structure into the fluids. In contrast, formulation D-4 displays much greater viscosity at the same concentration. The shear response for this formulation is shown in FIG. 12.

The formulation with cross-linked polyDADMAC C (D-4) shows the greatest viscosity and yield point of any of the fluids tested. Some degradation of the fluid performance does occur after exposure to 300° F. (149° C.) but, at 6.0 lbf/100 ft² (Table 9), the fluid maintains a yield point an order of magnitude higher than any of the other formulations. The cross-linked polyDADMAC formulation maintains a yield point more than two orders of magnitude higher than D-3, which is the standard xanthan/cross-linked starch formulation.

325° F. and further optimizing the brine formulations. Xanthan is eliminated from these formulations and replaced with polyDADMAC C and SDBS. The formulations evaluate the partial and complete replacement of cross-linked starch with an ATBS-Morpholine copolymer and a 4-armed PEG. Additionally, the concentration of monoethanol amine is increased in these brines to increase the oxidation resistance of the base fluid. The formulations are presented in Table 10 and the shear response profiles before and after the static aging step are presented in FIGS. 13A, 13B, and 14.

TABLE 9

Yield points and plastic viscosities for Experiment D.

| Sample D# | Best Fit | Yield Point (lbf/100 * ft²) | Plastic Viscosity (cP) | % Recovery Yield Point | % Recovery Plastic Viscosity |
|---|---|---|---|---|---|
| D-1 | Windhab | 0.42 | 289.9 | 26.8 | 74.3 |
| D-1 After 16 hr 300° F. | Polynomial | 0.11 | 215.4 | | |
| D-1 | Windhab | 0.30 | 286.4 | 109.2 | 84.0 |
| D-1 After 16 hr 325° F. | Windhab | 0.33 | 240.7 | | |
| D-2 | Windhab | 1.12 | 399.7 | 51.6 | 66.2 |
| D-2 After 16 hr 300° F. | Windhab | 0.58 | 264.6 | | |
| D-2 | Hershel-Bulkley | 1.18 | 414.0 | | |
| D-2 After 16 hr 325° F. | Polynomial | 0.24 | 186.5 | 20.3 | 45.0 |
| D-3 | Windhab | 2.34 | 58.7 | | |
| D-3 After 16 hr 300° F. | Hershel-Bulkley | 0.038 | 28.7 | 1.6 | 48.0 |
| D-4 | Hershel-Bulkley | 19.56 | 946.2 | | |
| D-4 After 16 hr 300° F. | Windhab | 5.95 | 676.1 | 30.4 | 71.5 |

Experiment E

Experiment E builds further on the results from Experiment D by extending the temperature limit from 300° F. to

TABLE 10

Formulations for Experiment E.

| Name | Amount | Units | Sample | Additive | Amount |
|---|---|---|---|---|---|
| Monoethanol amine | 10.0 | mL | E-1 | polyDADMAC C | 12.0 grams |
| Calcium Carbonate - 2 Micron | 10.0 | grams | | SDBS | 12.0 grams |
| | | | | Cross-linked starch | 8.0 grams |
| Calcium Carbonate - 5 Micron | 10.0 | grams | E-2 | ATBS-Morpholine copolymer | 6.0 grams |
| | | | | polyDADMAC C | 12.0 grams |
| Calcium Carbonate - 12 Micron | 10.0 | grams | | SDBS | 12.0 grams |
| | | | | Cross-linked starch | 3.0 grams |
| Magnesium Oxide | 5.0 | grams | E-3 | ATBS-Morpholine copolymer | 8.0 grams |
| Silicone defoamer | 2.0 | grams | | | |
| Sodium Thiosulfate | 2.0 | grams | | | |
| CaBr₂ brine | 320 | mL | | polyDADMAC C | 12.0 grams |
| | | | | SDBS | 12.0 grams |
| | | | E-4 | ATBS-Morpholine copolymer | 8.0 grams |
| | | | | polyDADMAC C | 12.0 grams |
| | | | | SDBS | 12.0 grams |
| | | | | 4-armed PEG | 16.0 grams |

Figure 13A:
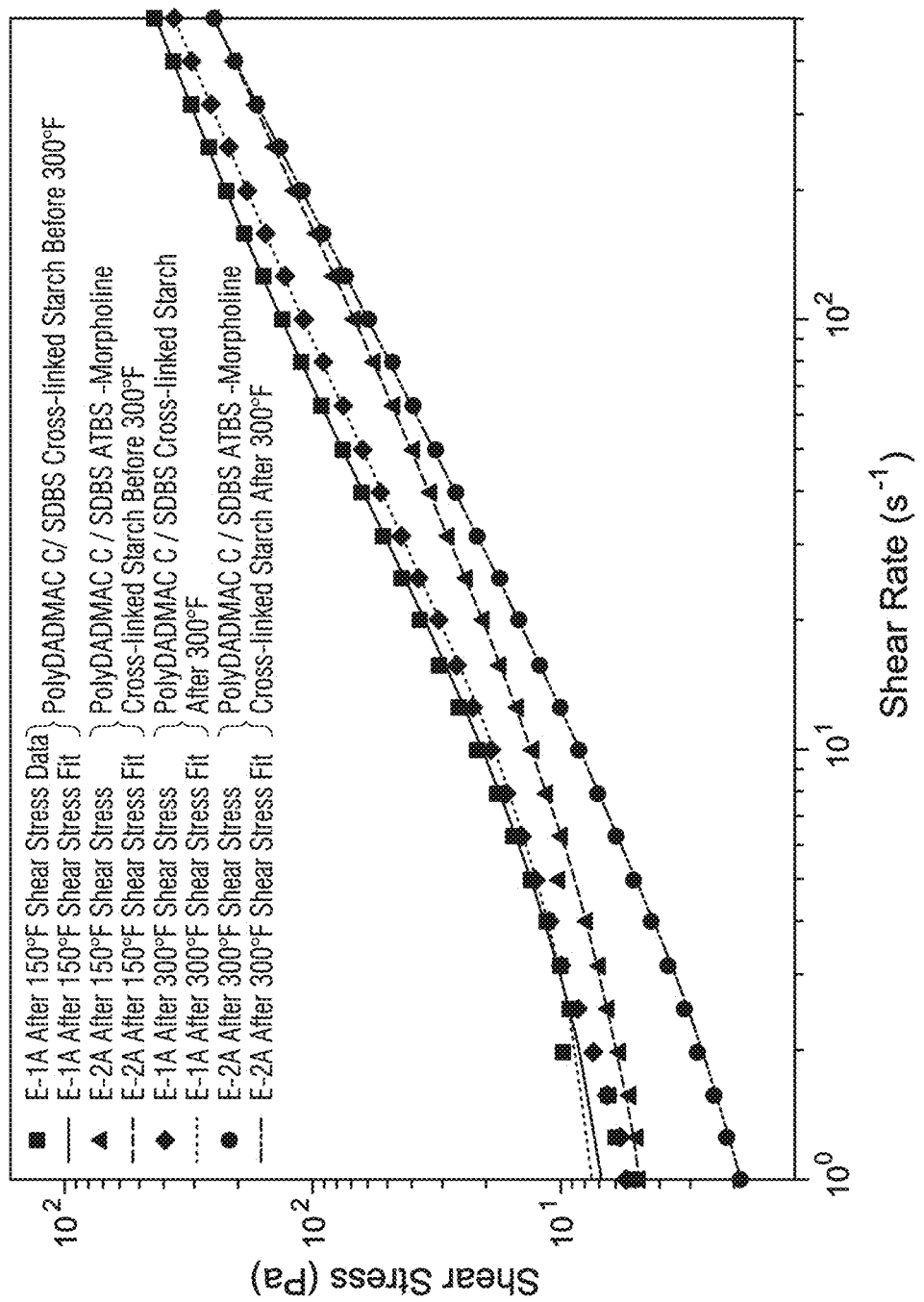
FIGS. 13A and 13B present graphs showing: (A) A shear response comparison of the cross-linked polyDADMAC C/SDBS/cross-linked starch brine (E-1) with a brine containing cross-linked polyDADMAC C/SDBS/ATBS-Morpholine copolymer/cross-linked starch brine (E-2) before and after static aging at 300° F. (149° C.) and (B) A shear response comparison of the cross-linked polyDADMAC C/SDBS/ATBS-Morpholine copolymer (E-3) with a brine containing cross-linked polyDADMAC C/SDBS/ATBS-Morpholine copolymer and a four-armed PEG (E-4) before and after static aging at 300° F. (149° C.).
Figure 13B:
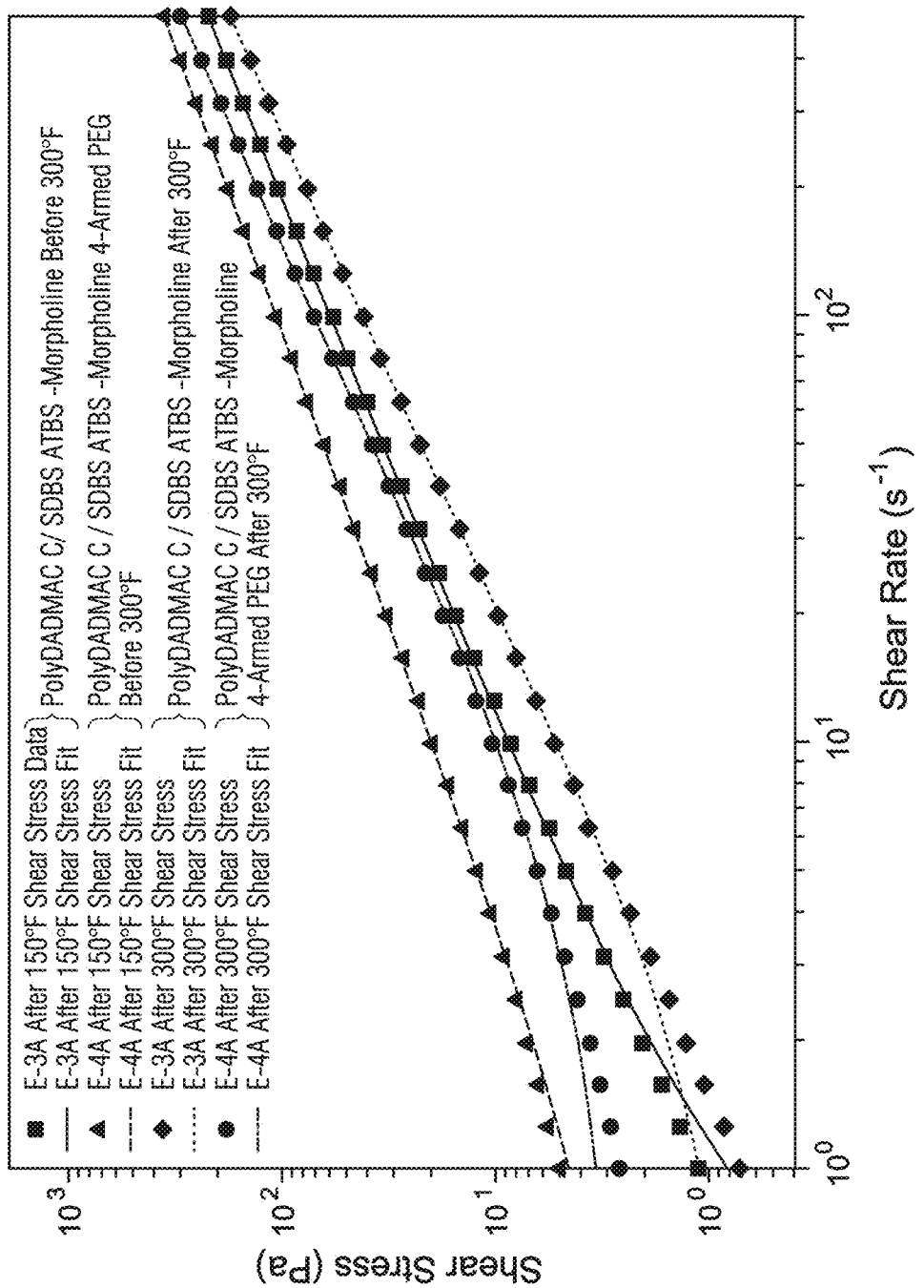
Figure 14A:
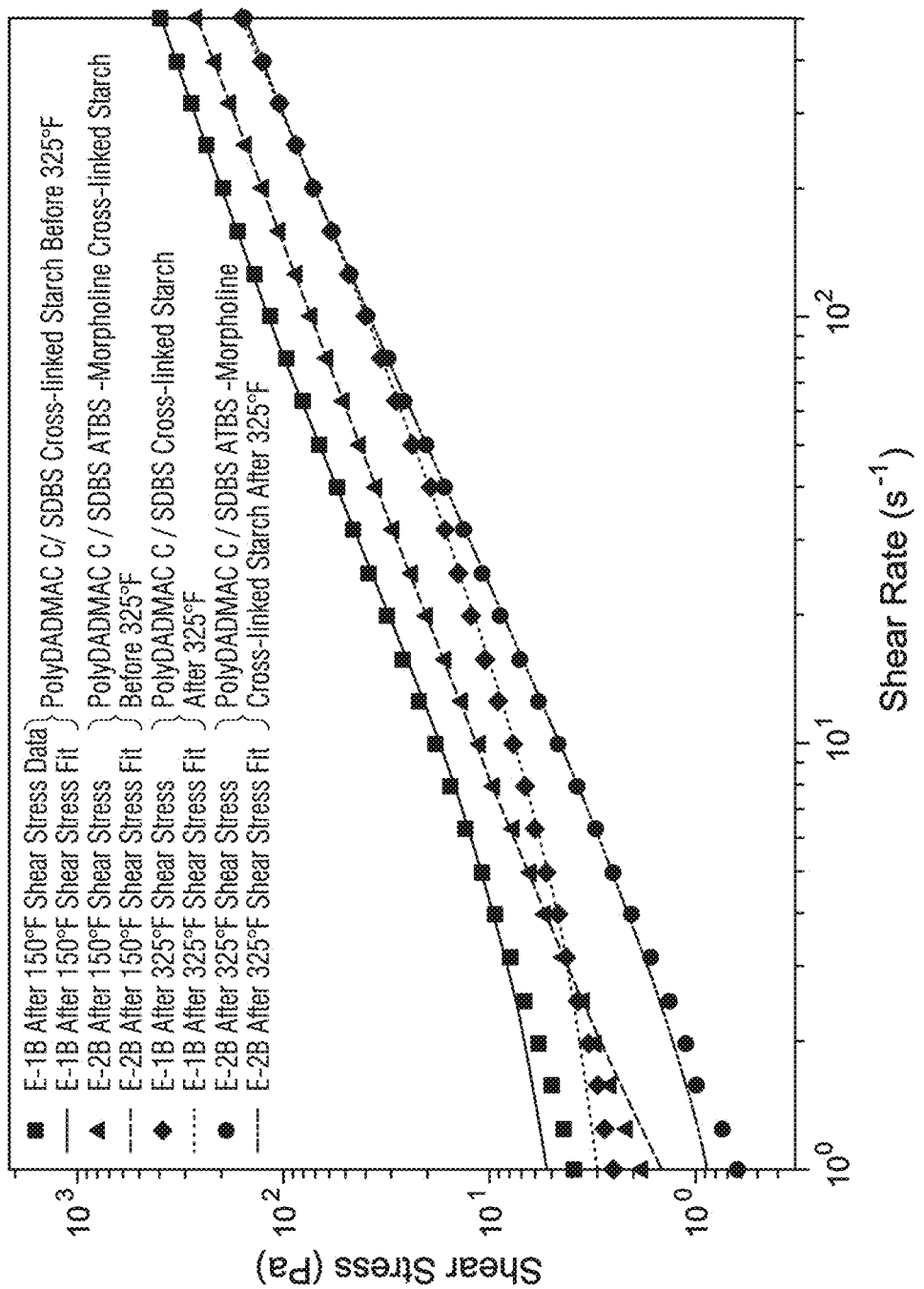
FIGS. 14A and 14B present graphs showing: (A) A shear response comparison of the cross-linked polyDADMAC C/SDBS/cross-linked starch brine (E-1) with a brine containing cross-linked polyDADMAC C/SDBS/ATBS-Morpholine copolymer/cross-linked starch brine (E-2) before and after static aging at 325° F. (163° C.) and (B) A shear response comparison of the cross-linked polyDADMAC C/SDBS/ATBS-Morpholine copolymer (E-3) with a brine containing cross-linked polyDADMAC C/SDBS/ATBS-Morpholine copolymer and a four-armed PEG (E-4) before and after static aging at 325° F. (163° C.).
Figure 14B:
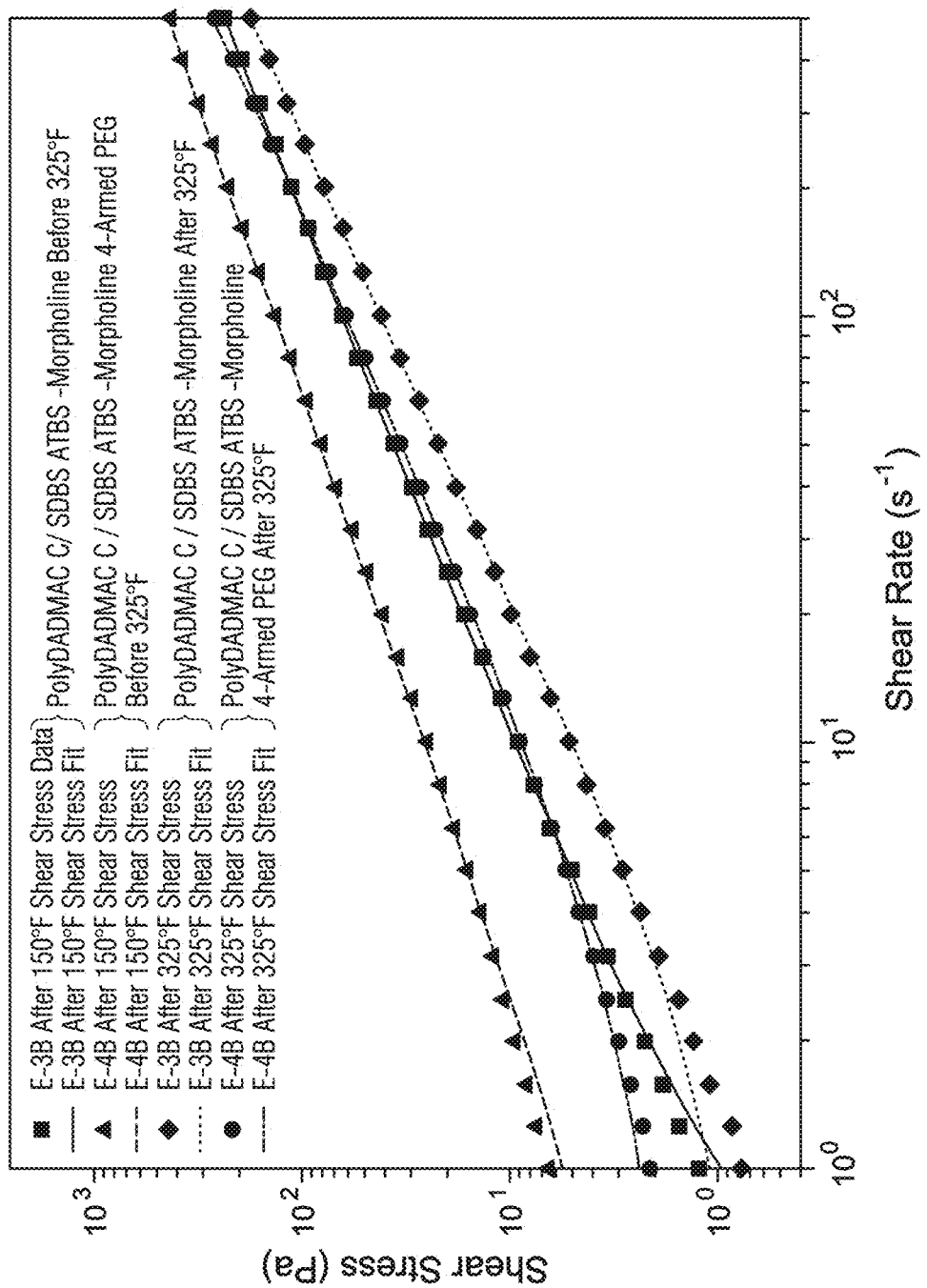

Sample E-1 uses polyDADMAC C and SDBS with cross-linked starch as the combined viscosifier/fluid loss agent. FIG. 13A shows that this formulation tolerates 300° F. (149° C.) but does show some degradation, most likely of the cross-linked starch. For FIG. 14A, the degradation appears more pronounced at 325° F. (163° C.). This effect is quantified in Tables 11 and 12 as 64.0% and 56.9% reduction in yield point for the static aging of E-1 at 300° F. (149° C.) and 325° F. (163° C.), respectively.

Partially replacing cross-linked starch with the ATBS-Morpholine copolymer (E-2) did not have the desired effect of increasing the temperature resistance of the viscosifier as observed with a decrease in yield point of 16.5% and 49.8%, at 300° F. (149° C.) and 325° F. (163° C.), respectively. The complete replacement of the cross-linked starch with the ATBS-Morpholine copolymer reversed this trend (see FIGS. 13 and 14, E-3 and E-4). E-4 includes the 4-armed PEG, this formulation appears to give the best temperature tolerance at 300° F. (149° C.) and 325° F. (163° C.). The are some chemical changes, however, these fluids exhibit little discoloration and continued elastic structure after the aging process.

PolyDADMAC performance is improved through the addition of an anionic surfactant, such as for example SDBS. Not only is the viscosity increased, but the brine suspendability and temperature tolerance is improved. The development of a high-temperature tolerant viscosifier for completion brines and reservoir drilling fluids allows for the use of brines at higher temperatures and thus greater depths in hydrocarbon-bearing reservoirs. Ultimately, this can lead to increased production and lower production costs. A brine formulation which includes a polyDADMAC and sodium dodecylbenzenesulfonate complex for brine viscosification is disclosed. An additional solution includes a synthetic ATBS based fluid loss control polymer which works with the viscosifier. Further increasing the performance of the brine, an oxygen scavenger based on a hydroxylamine and an ascorbic acid may be selected for inclusion into the brine.

In some embodiments of the present disclosure, increased viscosity compositions with increased particle suspendability are made without or in the absence of gels or pre-gels. In some embodiments of the present disclosure, increased viscosity compositions with increased particle suspendabil-

TABLE 11

Yield points and plastic viscosities from Experiment E after aging at 300° F. (149° C.).

| Sample E# | Best Fit | Yield Point (lbf/100 * ft$^2$) | Plastic Viscosity (cP) | % Recovery Yield Point | % Recovery Plastic Viscosity |
|---|---|---|---|---|---|
| E-1 | Windhab | 11.1 | 630.4 | | |
| E-1 After 16 hr 300° F. | Hershel-Bulkley | 7.1 | 418.0 | 64.0 | 66.3 |
| E-2 | Windhab | 13.0 | 549.7 | | |
| E-2 After 16 hr 300° F. | Hershel-Bulkley | 2.0 | 432.0 | 16.5 | 68.6 |
| E-3 | Hershel-Bulkley | 2.1 | 377.3 | | |
| E-3 After 16 hr 300° F. | Windhab | 1.3 | 293.0 | 60.7 | 77.7 |
| E-4 | Hershel-Bulkley | 2.5 | 568.1 | | |
| E-4 After 16 hr 300° F. | Windhab | 5.5 | 508.9 | 222.8 | 89.6 |

TABLE 12

Yield points and plastic viscosities from Experiment E after aging at 325° F. (163° C.).

| Sample E# | Best Fit | Yield Point (lbf/100 * ft$^2$) | Plastic Viscosity (cP) | % Recovery Yield Point | % Recovery Plastic Viscosity |
|---|---|---|---|---|---|
| E-1 | Windhab | 8.1 | 603.9 | | |
| E-1 After 16 hr 325° F. | Hershel-Bulkley | 4.6 | 273.2 | 56.9 | 45.2 |
| E-2 | Hershel-Bulkley | 4.0 | 431.5 | | |
| E-2 After 16 hr 325° F. | Windhab | 0.9 | 281.7 | 49.8 | 148.8 |
| E-3 | Hershel-Bulkley | 2.3 | 406.7 | | |
| E-3 After 16 hr 325° F. | Windhab | 1.3 | 301.0 | 56.5 | 74.0 |
| E-4 | Hershel-Bulkley | 1.7 | 679.8 | | |
| E-4 After 16 hr 325° F. | Hershel-Bulkley | 3.0 | 477.7 | 177.1 | 70.26736 | ity are made without or in the absence of cross-linked polymers, such as cross-linked ATBS copolymers.

The singular forms "a," "an," and "the" include plural referents, unless the context clearly dictates otherwise.

In the drawings and specification, there have been disclosed embodiments of compositions, systems, and methods for high temperature brine viscosification of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A viscosity-retaining formulation for use in high-temperature hydrocarbon-bearing reservoir applications, the formulation comprising:
    a brine composition for a drilling, completion, or workover fluid, the brine composition comprising monoethanolamine at between 1.25 volume percent of the brine composition and 3.13 volume percent of the brine composition; and
    a viscosity enhancing composition, the viscosity enhancing composition operable to enhance viscosity retention of the viscosity-retaining formulation at least, in part, through micellization, the viscosity enhancing composition comprising:
        a polycation composition comprising poly(diallyldimethylammonium chloride) (polyDADMAC);
        an anionic surfactant composition, the anionic surfactant composition comprising sodium dodecylbenzenesulfonate (SDBS); and
        an acrylamido-tertiary-butylsulfonic acid (ATBS)-Morpholine copolymer, where the amount of the polyDADMAC, SDBS, and ATBS-Morpholine copolymer in the formulation increase resistance of the brine composition to thermal degradation.

2. The formulation of claim 1, where the brine composition comprises at least one component selected from the group consisting of: calcium bromide; a non-cross-linked starch additive; a cross-linked starch additive; a polysaccharide; magnesium oxide; antifoam; a bridging calcium carbonate; sodium thiosulfate;
    and mixtures thereof.

3. The formulation of claim 1, further comprising a fluid loss control additive.

4. The formulation of claim 1, where the viscosity-retaining formulation retains about 90% of an original viscosity after heating to about 300° F.

5. The formulation of claim 1, where the viscosity-retaining formulation retains about 80% of an original viscosity after heating to about 300° F.

6. The formulation of claim 1, where the viscosity-retaining formulation retains between about 20% and about 60% of an original viscosity after heating to about 300° F.

7. The formulation of claim 1, where the viscosity-retaining formulation retains between about 60% and about 80% of an original viscosity after heating to about 300° F.

8. The formulation of claim 1, further comprising a charge neutral polymer.

9. The formulation of claim 8, where the charge neutral polymer comprises polyethylene glycol.

10. The formulation of claim 1, where the brine composition comprises at least one component selected from the group consisting of: potassium formate; potassium chloride; sodium chloride; sodium bromide; calcium chloride; calcium bromide; a calcium chloride and calcium bromide mix; a calcium chloride, calcium bromide, and zinc bromide mix; zinc bromide; cesium formate; and mixtures thereof.

11. A method for making a viscosity-retaining brine formulation for use in high-temperature hydrocarbon-bearing reservoir applications, the method comprising the steps of:
    formulating a base brine composition for a drilling, completion, or workover fluid, the brine composition comprising monoethanolamine at between 1.25 volume percent of the brine composition and 3.13 volume percent of the brine composition; and
    admixing with the base brine composition a viscosity enhancing composition, the viscosity enhancing composition operable to enhance viscosity retention of the viscosity-retaining brine formulation at least, in part, through micellization, the viscosity enhancing brine composition comprising:
        a polycation composition comprising poly(diallyldimethylammonium chloride) (polyDADMAC);
        an anionic surfactant composition, the anionic surfactant composition comprising sodium dodecylbenzenesulfonate (SDBS); and
        an acrylamido-tertiary-butylsulfonic acid (ATBS)-Morpholine copolymer; and
    increasing resistance of the base brine composition to thermal degradation by admixing with the base brine composition the viscosity enhancing composition.

12. The method of claim 11, further comprising the step of admixing with the formulation polyethylene glycol (PEG).

13. The method of claim 12, where the PEG comprises multi-armed PEG.

14. The method of claim 11, where the step of formulating a base brine composition includes the step of admixing at least one component selected from the group consisting of: calcium bromide; a non-cross-linked starch additive; a cross-linked starch additive; a polysaccharide; magnesium oxide; antifoam; a bridging calcium carbonate; sodium thiosulfate; and mixtures thereof.

15. The method of claim 11, further comprising the step of adding a fluid loss control additive.

16. The method of claim 11, further comprising the step of adding the viscosity-retaining brine formulation to a high-temperature hydrocarbon-bearing reservoir, where the viscosity-retaining brine formulation retains about 90% of an original viscosity after heating to about 300° F.

17. The method of claim 11, further comprising the step of adding the viscosity-retaining brine formulation to a high-temperature hydrocarbon-bearing reservoir, where the viscosity-retaining brine formulation retains about 80% of an original viscosity after heating to about 300° F.

18. The method of claim 11, further comprising the step of adding the viscosity-retaining brine formulation to a high-temperature hydrocarbon-bearing reservoir, where the viscosity-retaining brine formulation retains between about 20% and about 60% of an original viscosity after heating to about 300° F.

19. The method of claim 11, further comprising the step of adding the viscosity-retaining brine formulation to a high-temperature hydrocarbon-bearing reservoir, where the viscosity-retaining brine formulation retains between about 60% and about 80% of an original viscosity after heating to about 300° F.

* * * * *